(12) United States Patent
Ueda et al.

(10) Patent No.: US 8,762,833 B2
(45) Date of Patent: Jun. 24, 2014

(54) INFORMATION PROCESSING APPARATUS FOR DISPLAYING DOCUMENT INFORMATION, ITS PROCESSING METHOD, AND STORAGE MEDIUM

(75) Inventors: Masami Ueda, Tsurugashima (JP); Takuya Miyazato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 13/078,783

(22) Filed: Apr. 1, 2011

(65) Prior Publication Data

US 2011/0258540 A1     Oct. 20, 2011

(30) Foreign Application Priority Data

Apr. 16, 2010   (JP) ................................. 2010-095311
Nov. 30, 2010   (JP) ................................. 2010-267731

(51) Int. Cl.
*G06F 17/00*          (2006.01)
(52) U.S. Cl.
USPC ............ 715/243; 715/204; 715/229; 715/255
(58) Field of Classification Search
USPC ................... 715/204, 229, 243, 255
See application file for complete search history.

(56) References Cited

U.S. PATENT DOCUMENTS

| 7,379,950 B2 | 5/2008 | Sato et al. |
| 7,559,024 B2 | 7/2009 | Mori et al. |
| 2005/0257158 A1* | 11/2005 | Lombardo ..................... 715/751 |
| 2005/0286944 A1* | 12/2005 | Kanamoto et al. ............ 399/365 |
| 2007/0032887 A1* | 2/2007 | Muroi et al. ..................... 700/19 |
| 2007/0234238 A1* | 10/2007 | Komamura et al. .......... 715/857 |
| 2008/0056620 A1* | 3/2008 | Komamura et al. .......... 382/306 |
| 2009/0216726 A1* | 8/2009 | Muthaiah et al. ................. 707/3 |
| 2009/0235155 A1 | 9/2009 | Ueda |
| 2010/0157371 A1* | 6/2010 | Miyata ......................... 358/1.15 |

FOREIGN PATENT DOCUMENTS

JP    2004246582 A    9/2004

* cited by examiner

*Primary Examiner* — Stephen Hong
*Assistant Examiner* — Matthew Ludwig
(74) *Attorney, Agent, or Firm* — Fitzpatrick, Cella, Harper & Scinto

(57) ABSTRACT

An information processing apparatus displays document information obtained from a storing unit for storing document time/date information at which document data is processed and the document information including storing time/date information at which the document data is stored. The apparatus obtains displaying order information for deciding order of displaying the document information when the document information is displayed, sorts the document information in accordance with the obtained displaying order information, displays the sorted document information. The displaying order information is displaying order based on the storing time/date information. The document information is sorted in accordance with the storing time/date information in order from the old storing time/date information. on the basis of the storing time/date information of the document information, the document information in which a predetermined time has elapsed is displayed distinguishably from the document information in which the predetermined time has not elapsed.

10 Claims, 19 Drawing Sheets

FIG. 7

FOLDER TABLE

| FOLDER ID | FOLDER NAME | DISPLAYING ORDER | CHANGE TIMING | ELAPSED TIME AND CHANGE COLOR |
|---|---|---|---|---|
| 00001 | FOLDER A | ORDER OF INPUTTING TIME/DATE TO FOLDER | NON-ACCESS | 90min-#F08080, 8hour-#CD5C5C |
| 00002 | FOLDER B | ORDER OF CREATION TIME/DATE OF DOCUMENT | – | – |
| 00003 | FOLDER C | ORDER OF UPDATING TIME/DATE OF DOCUMENT | – | – |
| 00004 | FOLDER D | ORDER OF CREATION TIME/DATE OF DOCUMENT | – | – |

FIG. 8

| DOCUMENT ID | DOCUMENT NAME | CREATION TIME/DATE | UPDATING TIME/DATE | ACCESSING TIME/DATE | STORAGE DESTINATION FOLDER ID | INPUTTING TIME/DATE TO FOLDER | DOCUMENT THUMBNAIL | END OF PROCESS |
|---|---|---|---|---|---|---|---|---|
| 00001 | DOCUMENT A | 2009/11/20 0:00 | 2009/11/22 0:00 | 2009/11/22 0:00 | 00001 | 2009/11/20 10:00 | XXXX | 0 |
| 00002 | DOCUMENT B | 2009/11/20 0:00 | 2009/11/22 0:00 | 2009/11/22 0:00 | 00001 | 2009/11/20 0:00 | XXXX | 1 |
| 00003 | DOCUMENT C | 2009/11/20 0:00 | 2009/11/21 0:00 | 2009/11/21 0:00 | 00005 | 2009/11/20 0:00 | XXXX | 1 |
| 00004 | DOCUMENT D | 2009/11/25 0:00 | 2009/11/25 0:00 | 2009/11/25 0:00 | 00001 | 2009/11/25 0:00 | XXXX | 0 |

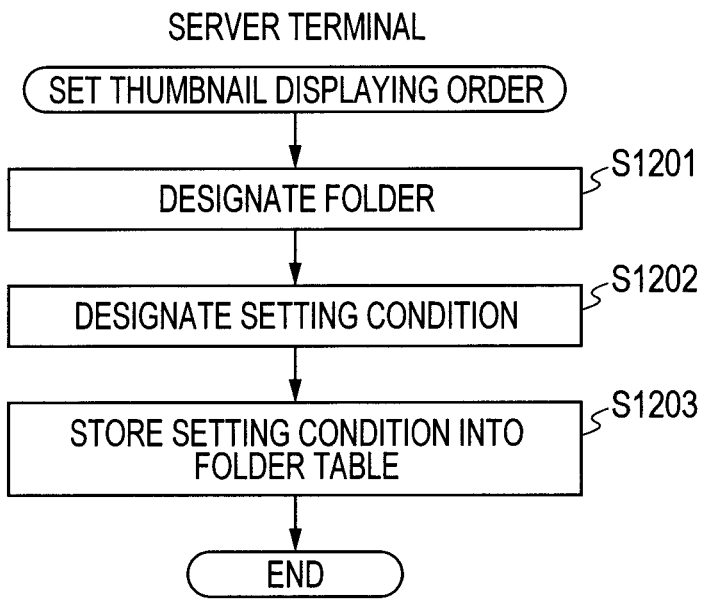
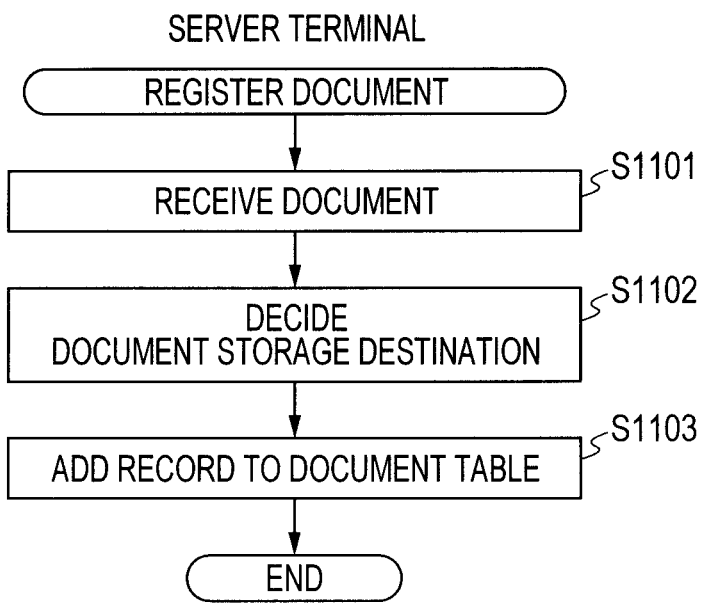

FIG. 15

DOCUMENT LIST INFORMATION

| DOCUMENT ID | DOCUMENT NAME | CREATION TIME/DATE | UPDATING TIME/DATE | ACCESSING TIME/DATE | STORAGE DESTINATION FOLDER ID | INPUTTING TIME/DATE TO FOLDER | DOCUMENT THUMBNAIL | END OF PROCESS |
|---|---|---|---|---|---|---|---|---|
| 00001 | DOCUMENT A | 2009/11/20 0:00 | 2009/11/22 0:00 | 2009/11/22 0:00 | 00001 | 2009/11/20 10:00 | XXXX | 0 |
| 00002 | DOCUMENT B | 2009/11/20 0:00 | 2009/11/22 0:00 | 2009/11/22 0:00 | 00001 | 2009/11/20 0:00 | XXXX | 1 |
| 00004 | DOCUMENT D | 2009/11/25 0:00 | 2009/11/25 0:00 | 2009/11/25 0:00 | 00001 | 2009/11/25 0:00 | XXXX | 0 |

FIG. 16

| FOLDER ID | FOLDER NAME | DISPLAYING ORDER | CHANGE TIMING | ELAPSED TIME AND CHANGE COLOR | USER ID |
|---|---|---|---|---|---|
| 00001 | FOLDER A | ORDER OF INPUTTING TIME/DATE TO FOLDER | NON-ACCESS | 90min-#F08080, 8hour-#CD5C5C | yamada |
| 00002 | FOLDER B | ORDER OF CREATION TIME/DATE OF DOCUMENT | – | – | suzuki |
| 00003 | FOLDER C | ORDER OF UPDATING TIME/DATE OF DOCUMENT | – | – | sato |
| 00004 | FOLDER D | ORDER OF CREATION TIME/DATE OF DOCUMENT | – | – | kato |

FIG. 17

| DOCUMENT ID | DOCUMENT NAME | CREATION TIME/DATE | UPDATING TIME/DATE | ACCESSING TIME/DATE | STORAGE DESTINATION FOLDER ID | INPUTTING TIME/DATE TO FOLDER | DOCUMENT THUMBNAIL | PROCESSING STATE |
|---|---|---|---|---|---|---|---|---|
| 00001 | DOCUMENT A | 2009/11/20 0:00 | 2009/11/22 0:00 | 2009/11/22 0:00 | 00001 | 2009/11/20 10:00 | XXXX | 0 |
| 00002 | DOCUMENT B | 2009/11/20 0:00 | 2009/11/22 0:00 | 2009/11/22 0:00 | 00001 | 2009/11/20 0:00 | XXXX | 1 |
| 00003 | DOCUMENT C | 2009/11/20 0:00 | 2009/11/21 0:00 | 2009/11/21 0:00 | 00005 | 2009/11/20 0:00 | XXXX | 1 |
| 00004 | DOCUMENT D | 2009/11/25 0:00 | 2009/11/25 0:00 | 2009/11/25 0:00 | 00001 | 2009/11/25 0:00 | XXXX | 2 |

FIG. 18

| USER ID | E-MAIL ADDRESS | USER ID OF SUPERIOR (ACCEPTOR) |
|---|---|---|
| yamada | yamada@***.co.jp | suzuki |
| suzuki | suzuki@***.co.jp | wada |

FIG. 19

| PROCESS ID (WORKFLOW ID) | DOCUMENT ID OF ACCEPTANCE TARGET DOCUMENT | USER ID OF APPLICANT | USER ID OF ACCEPTOR | RESULT |
|---|---|---|---|---|
| 00001 | 00001 | yamada | suzuki | 0 |
| 00002 | 00004 | yamada | suzuki | 1 |
| 00003 | 00005 | yamada | suzuki | 2 | ic information of the document is displayed and a
INFORMATION PROCESSING APPARATUS FOR DISPLAYING DOCUMENT INFORMATION, ITS PROCESSING METHOD, AND STORAGE MEDIUM

BACKGROUND OF THE INVENTION

1. Field of the Invention

The present invention relates to an information processing apparatus for managing document data and displaying document information corresponding to the document data, its processing method, and its storage medium.

2. Description of the Related Art

When an image, a page of a document, or the like is displayed, a thumbnail (also referred to as a thumbnail image) is used as a reduced representative image in order to raise a visibility. Even if it is difficult to discriminate contents by file names or the like with respect to documents which are managed by folders or document management software in a PC (Personal Computer), by seeing the thumbnail, a whole image of the image or document can be easily recognized.

Therefore, an OS (Operating System) and many document management software have a thumbnail forming function. As a display format of the files, a list display in which bibliographic information of the document is displayed and a thumbnail display are performed.

As a displaying method of the thumbnails, there is a method whereby the thumbnails can be freely arranged in a display area of software, a method whereby the thumbnails are arranged and displayed in accordance with areas which were rezoned in a lattice shape in a display area, or the like.

In the case of arranging and displaying the thumbnails, as arranging order, the thumbnails are sorted and displayed in such order that they are horizontally arranged starting from the upper left position of the display area and reaching the right edge and are subsequently arranged from the left edge of the second column to the right edge of the second column.

Japanese Patent Application Laid-Open No. 2004-246582 discloses such a technique that in a display list area of thumbnails, the thumbnails are classified and displayed in the display area which were partitioned in a lattice shape on the basis of a plurality of management information.

However, according to the thumbnail display in the related art as disclosed in Japanese Patent Application Laid-Open No. 2004-246582, the documents are sorted based on the document names and thumbnail-displayed, or the documents are thumbnail-displayed every classification of the documents, or the documents are displayed in storing order of the document stored in each folder in the document management system. Therefore, there is a case where such a thumbnail display is unsuitable for management in FAX order-receiving business.

The FAX order-receiving business is a business in which FAX-received data is converted into images and registered into the document management system and an order-receiving operation is executed on the document management system on the basis of the received FAX data.

Reasons why the foregoing thumbnail display is unsuitable for the FAX order-receiving business are as follows.

For example, when there are a plurality of operators who perform the FAX order-receiving business, a folder is formed in the document management system every operator and each operator sequentially processes the documents input to the folder. In such a case, as an operation, since the documents are sequentially processed in inputting order of the documents which were input to the folders, the thumbnail display is set and operated in such a manner that the thumbnails are arranged and displayed in order of time/date at which the document was input to each folder from the old time/date.

According to such a mechanism that the thumbnails are displayed in order of time/date at which the document was input to the folder from the old time/date as mentioned above, if the document was erroneously input to another folder, when the operator who uses such a folder processes the document which was erroneously input, an operation to input the document to a proper folder again is executed. Therefore, according to such a mechanism that the thumbnails are sorted and displayed on the basis of the time/date at which the document was input to the folder, such a document is determined as a new document and is displayed at the last position in the displaying order of the thumbnails.

Consequently, in spite of a fact that the document is not a document to be inherently processed at last (that is, it is a document to be processed early), it is displayed at the last position in the layout of the thumbnails. Therefore, a problem in which the operator is not aware of such a fact and the process of the document is delayed occurs.

There is also considered a method whereby the thumbnails are arranged and displayed in order from the old time/date by using the time/date at which the FAX was received or the time/date at which the FAX data was converted into the image and the image data was formed. However, according to such a method, for example, there is a case where if there is an administrator who distributes the documents to the folders, when the administrator has inputted the documents in such order that he wants to request the operator to process them, the displaying order of the thumbnails is rearranged in accordance with the time/date at which the document was received, so that such a method is unsuitable.

Particularly, in the FAX order-receiving business, since a response time (a primary answer is made to the orderer within ○ days, the ordered articles are delivered within Δ days, or the like) is often set to a landmark, there is also a case where if the documents are not displayed in processing order, a leakage of processes occurs and it is difficult to accomplish the landmark.

SUMMARY OF THE INVENTION

The present invention provides with an information processing apparatus for displaying document information obtained from a storing unit for storing document time/date information at which document data is processed and the document information including storing time/date information at which the document data is stored, comprising: an obtaining unit that obtains displaying order information for deciding order of displaying the document information when the document information is displayed; a sorting unit that sorts the document information in accordance with the obtained displaying order information; and a displaying unit that displays the sorted document information. The displaying order information is displaying order based on the storing time/date information. The sorting unit sorts the document information in accordance with the storing time/date information in order from the old storing time/date information. On the basis of the storing time/date information of the document information, the displaying unit displays the document information in which a predetermined time has elapsed distinguishably from the document information in which the predetermined time has not elapsed.

Among the documents sorted on the basis of the storing time/date, by distinction-displaying the documents in which the predetermined time has elapsed from the document inputting time/date, a leakage of the documents to be processed can be prevented.

Further features of the present invention will become apparent from the following description of exemplary embodiments with reference to the attached drawings.

BRIEF DESCRIPTION OF THE DRAWINGS

FIG. 7 is an example of a folder table in the embodiment of the invention.

FIG. 8 is an example of a document table in the embodiment of the invention.

FIG. 9 is a flowchart illustrating an example of a thumbnail displaying order of the document management system in the embodiment of the invention.

FIG. 10 is a flowchart illustrating an example of a registering procedure of a document of the document management system in the embodiment of the invention.

FIG. 15 is a table diagram illustrating document list information in the folder to be displayed in the document management system in the embodiment of the invention.

FIG. 16 is an example of a folder table of a workflow process in the embodiment of the invention.

FIG. 17 is an example of a document table of the workflow process in the embodiment of the invention.

FIG. 18 is an example of a user table of the workflow process in the embodiment of the invention.

FIG. 19 is an example of an accepting process table of the workflow process in the embodiment of the invention.

DESCRIPTION OF THE EMBODIMENTS

Embodiments of the invention will be described hereinbelow with reference to the drawings.

Figure 1:
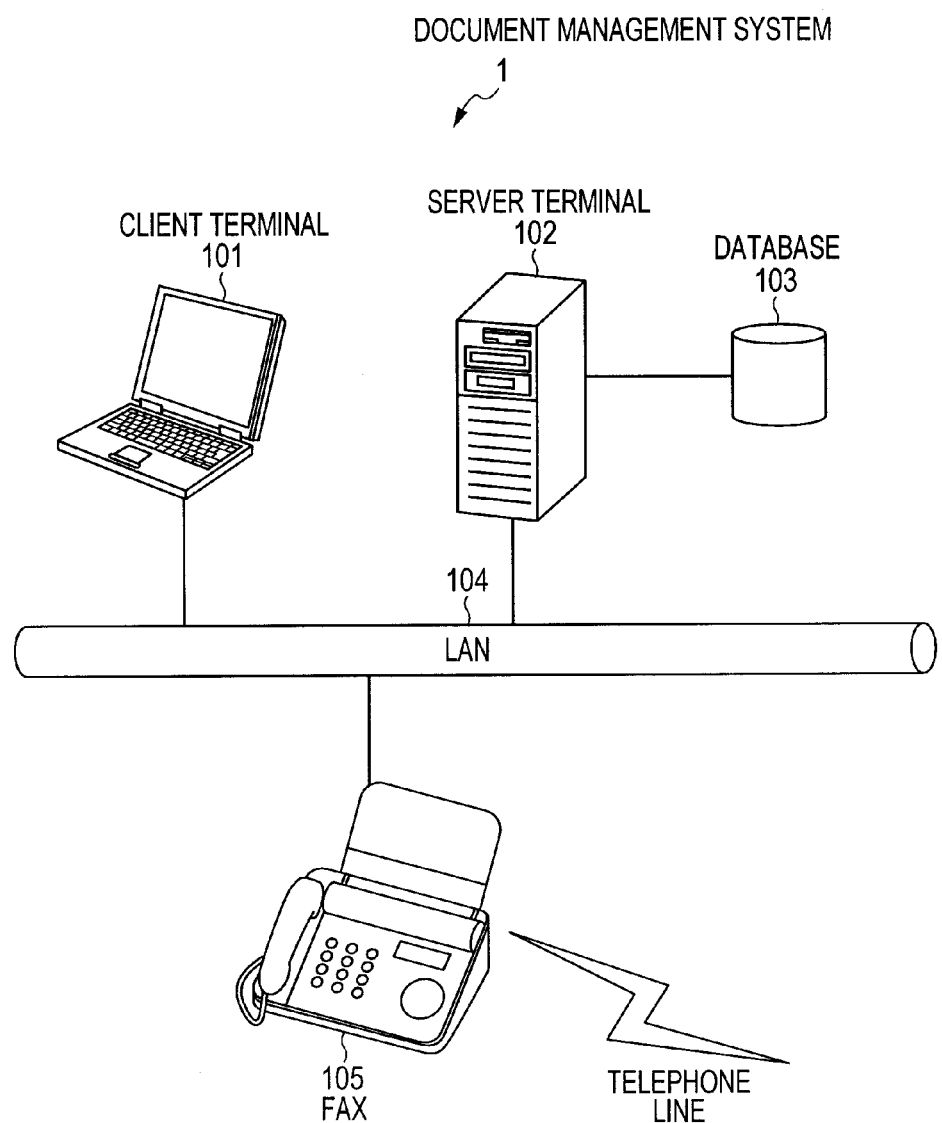
FIG. 1 is a diagram illustrating a construction of a document management system in an embodiment of the invention.

FIG. 1 is a diagram illustrating a construction of a document management system 1 according to an embodiment of the invention.

In FIG. 1, a server terminal 102, a client terminal (information processing apparatus) 101, and a FAX (facsimile apparatus) 105 (which may be a multifunction apparatus having a FAX function) are connected through a network such as a LAN 104 so that they can communicate with each other. The server terminal 102 is connected to a database 103 (storing unit) in which document (image) data obtained from the FAX 105 or a scanner (not shown) and thumbnail images adapted to thumbnail-display the document data on the client terminal have been registered. The registered document data (registration document) and the thumbnail images may be registered in a storing unit in another server.

The client terminal allows the registration document and the thumbnail images to be displayed. The server terminal 102 transmits the registration document and the thumbnail images to the client terminal 101 in response to a request from the client terminal 101. The server terminal 102 executes various kinds of processes such as movement of the document, display of a folder, and the like in response to a request from the client terminal 101. Management information to manage the registration document and the thumbnail images has been held in the server terminal 102 and the database 103. The document management system may be constructed so that there are a plurality of client terminals 101. The FAX 105 is connected to a FAX of an external network (for example, a FAX of a customer) through a telephone line so that they can communicate with each other. By transmitting the received FAX image to the server terminal 102, the document data is registered.

Each terminal has a function unit for realizing the invention. The client terminal 101 has the following function units: that is, a data communication function unit (for example, S1303, S1403, and S1408 are executed) for transmitting and receiving data to/from the server terminal 102; a display function unit (for example, S1415 is executed) for displaying the registration document and the thumbnail images obtained by the communication function unit; and a folder displaying order setting function unit (for example, S1201 to S1203 are executed) for setting displaying order of the folders.

The server terminal has the following function units: that is, a registration function unit for registering (storing) the document data obtained from the client terminal 101, FAX 105, or the like and the thumbnail images of the document data (registration document) into the storing unit; a management function unit (for example, various kinds of tables of FIGS. 7 and 8; S1305 is executed) for managing the registration document and the thumbnail images and annotations associated with the registration document and the thumbnail images; and a communication function unit (for example, steps for transmitting and receiving data to/from the client terminal; those steps are shown in flowcharts of FIGS. 11 to 13) on the server side for transmitting and receiving data to/from the client terminal. By operating each of those function units, the invention is realized.

Figure 2:
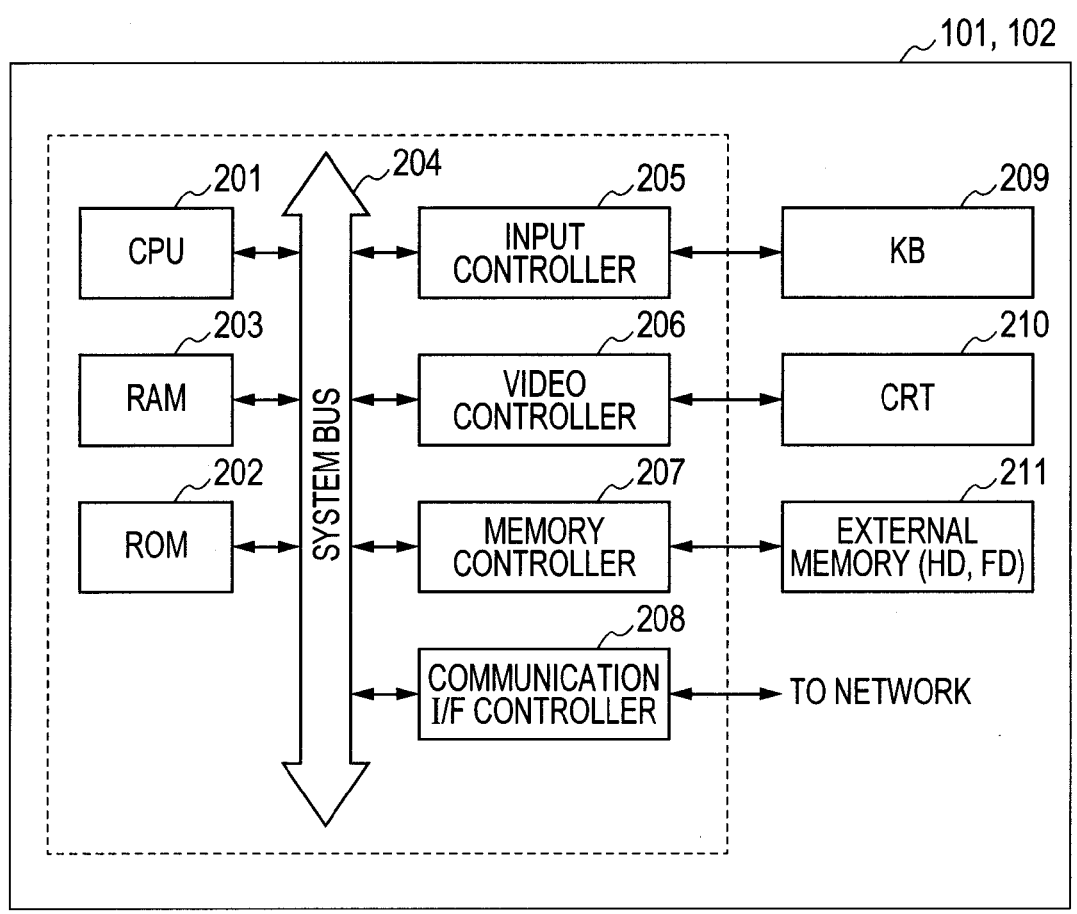
FIG. 2 is a diagram illustrating a hardware construction of various kinds of terminals in the embodiment of the invention.

FIG. 2 is a block diagram schematically illustrating a hardware construction of the server terminal 102 in FIG. 1. Since a hardware construction of the client terminal 101 is fundamentally the same as that of the server terminal 102, only the hardware construction of the server terminal 102 will be described and a description of the hardware construction of the client terminal 101 is omitted.

A CPU 201 synthetically controls each device and controllers which are connected to a system bus 204. A BIOS (Basic Input/Output System) and an operating system program (hereinbelow, referred to as OS) serving as control programs of the CPU 201, various kinds of programs which are necessary to realize functions which are executed by each server terminal or each client terminal, and the like have been stored in a ROM 202 or an external memory 211. A RAM 203 functions as a main memory, a work area, or the like of the CPU 201. The CPU 201 loads programs and the like which are necessary when executing processes into the RAM 203 and executes the programs, thereby realizing various kinds of operations.

An input controller (input C) 205 controls an input from a keyboard 209 or a pointing device such as a mouse or the like (not shown). A video controller (VC) 206 controls a display to a display device such as a CRT display (CRT) 210 or the like. The display is not limited only to the CRT but may be a liquid crystal display (LCD). The administrator uses them as necessary.

A memory controller (MC) 207 controls an access to the external memory 211 such as hard disk (HD) or floppy (registered trademark) disk for storing a boot program, browser software, various kinds of applications, font data, a user file, an edition file, various kinds of data, and the like. The MC 207 also controls an access to the external memory 211 such as a compact flash (registered trademark) memory or the like which is connected to a PCMCIA card slot through an adapter. A communication interface (I/F) controller (communication I/F C) 208 is connected to an external apparatus through the network and communicates therewith. The communication I/F C 208 executes a communication control process on the network. For example, Internet communication or the like using a TCP/IP can be made.

By executing, for example, a developing (rasterizing) process of an outline font to an area for display information in the RAM 203, the CPU 201 enables a display on the CRT 210. The CPU 201 also enables a user instruction by using a mouse cursor (not shown) on the CRT 210.

The document management system for realizing the invention and data which is used in the document management system have been recorded in the external memory 211. The document management system is loaded into the RAM 203 as necessary and is executed by the CPU 201. The external memory 211 may include the database 103.

Figure 3:
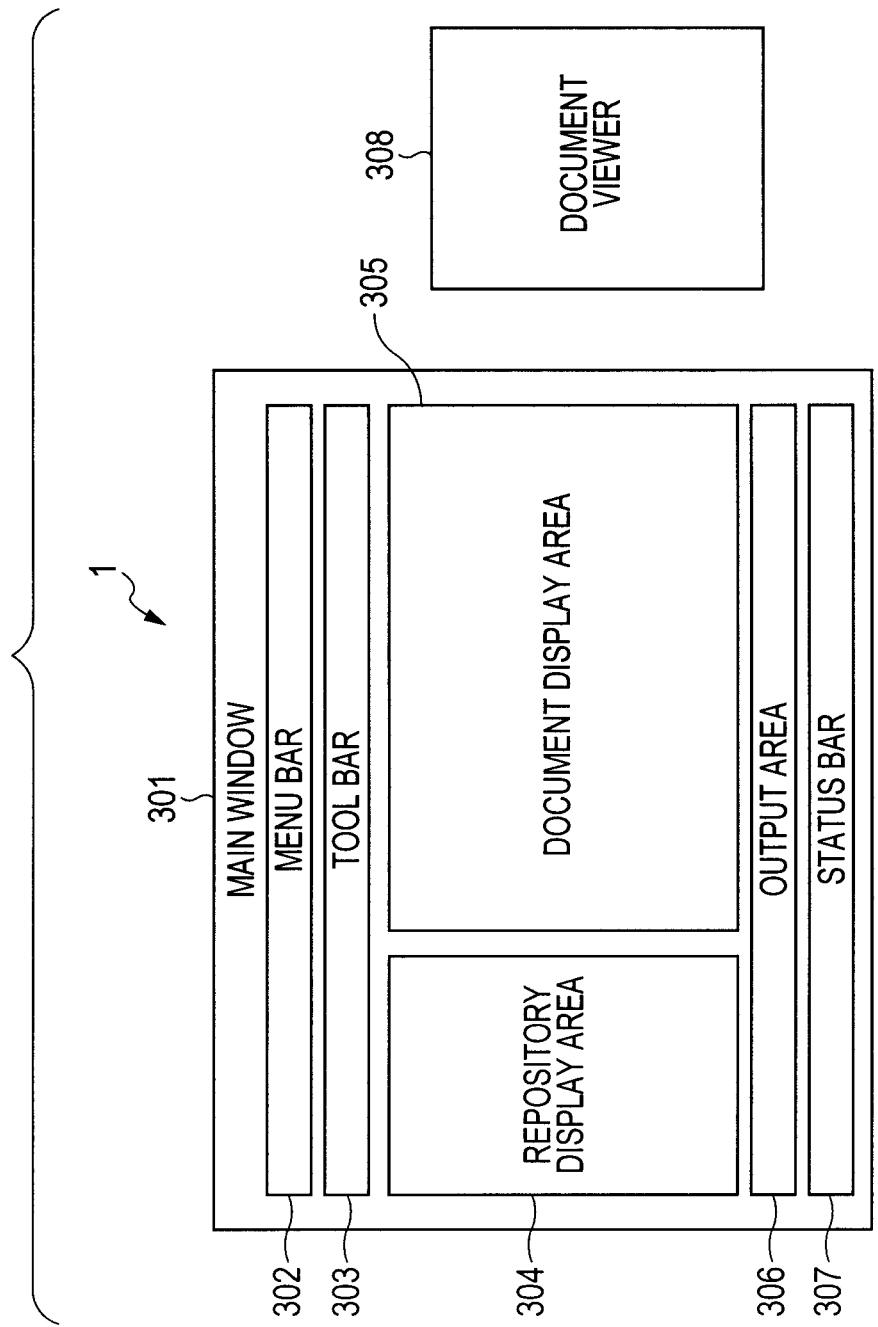
FIG. 3 is a diagram illustrating a schematic construction of a user interface of the document management system in the embodiment of the invention.

FIG. 3 is a schematic constructional diagram illustrating of a user interface (UI) of the document management system.

The document management system 1 is mainly constructed by a main window 301 and a document viewer 308. The main window 301 is a window to handle the files stored in the external memory 211.

The document viewer 308 is an image viewer for displaying images stored in the main window 301. It is assumed that application data stored in the main window 301 is handled by each of the corresponding applications.

A menu bar 302 is a menu operating area which is standard in "Windows" (registered trademark) for activating the function. A tool bar 303 displays each characteristic function in the menu bar 302 by a button as a "tool button".

A repository display area 304 is a tree view for displaying a cabinet construction and a folder construction in the database 103 which is used in the document management system. A document display area 305 is an area where the document in the area selected in the repository display area 304 is displayed in a thumbnail mode or a list mode. An output area 306 is an area for registering printer icons and other applications. The document displayed in the document display area 305 is dropped to the icon displayed in the output area 306, thereby enabling the document to be printed by a printer or enabling the document to be opened by the relevant application.

A status bar 307 is standard in "Windows (registered trademark). "Cabinet" is an independent unit of the document management and is a depository unit for collecting the folders formed by the user into one group. The database 103 is managed every cabinet.

By adding or deleting (that is, editing) various kinds of files of the document or image to/from the repository display area 304 or the document display area 305 on the basis of an input from the client terminal 101, the database 103 which is used in the document management system can be edited. At this time, various kinds of files in the folder can be also added or changed (that is, edited). The cabinet or folder can be also added (formed) or deleted (that is, edited).

Figure 4:
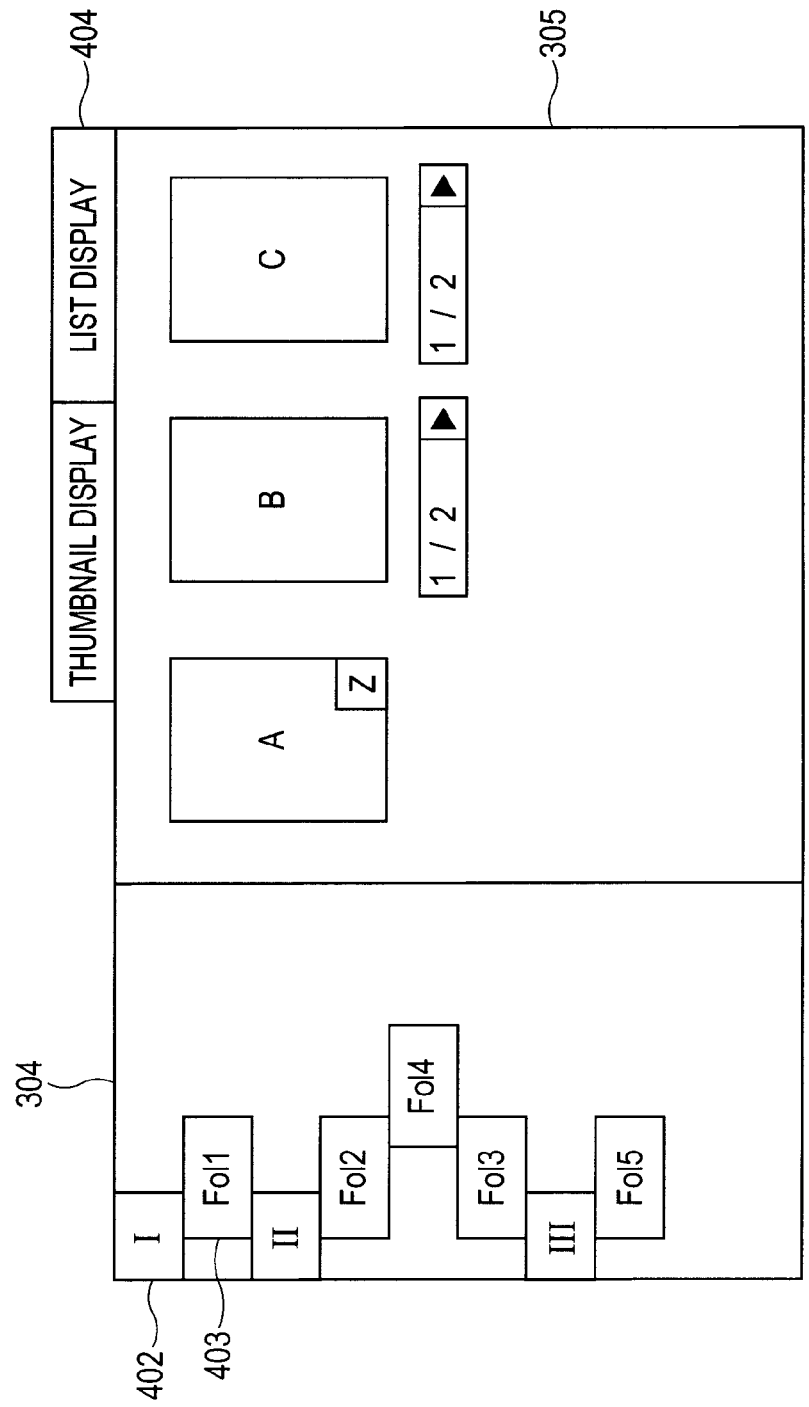
FIG. 4 is a diagram illustrating an example of a repository display area 304 and a document display area 305 in a main window 301 of a document management system 1 of the invention.

FIG. 4 is a diagram illustrating a schematic construction of the main window 301 and is a diagram illustrating an example of a thumbnail image display screen which is displayed in the display unit 210 in FIG. 2.

FIG. 4 illustrates an example, in a thumbnail format, in which three documents A, B, and C have been stored in a cabinet I-Fo11.

The document A is an application document. The application icon is displayed at the lower right position of the thumbnail image of the first page obtained from the application data. In this example, an icon "Z" is displayed. The documents B and C are image documents. An arrow shown under the thumbnail image indicates a page feeding operation. If the arrow is changed on the thumbnail, the thumbnail image of the relevant page can be displayed.

A tree view of the cabinets and the folders is displayed in the repository display area 304 in FIG. 4. A button 402 is a button showing the cabinet. A button 403 is a button showing the folder. The maximum unit of the area for storing the document is the cabinet and a predetermined number of folders can be formed therein. A button 404 is a part of the tool bar 303 and is a button to select either a mode in which the folders and document objects which are displayed in the document display area 305 are displayed in the thumbnail format or a mode in which they are displayed in the list format.

Figure 5:
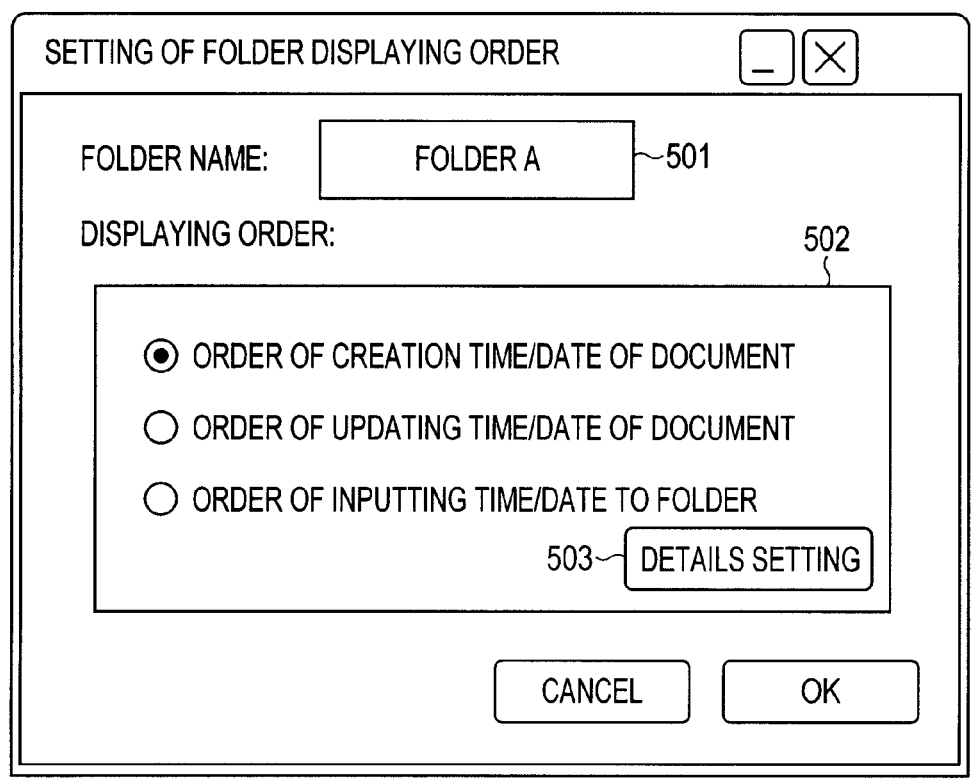
FIG. 5 is a setting display screen of displaying order of a folder in the embodiment of the invention.

FIG. 5 is a diagram of a user interface for setting displaying order of the folder. In which arranging order the documents are displayed on a folder unit basis of the document management system can be set.

A name of the folder serving as a target is displayed in a text field of "folder name" 501. In "displaying order" 502, one of "order of creation time/date of document", "order of updating time/date of document", and "order of inputting time/date to folder" is selected. "Details setting" 503 is a "details setting" button for setting options in the case where "order of inputting time/date to folder" has been selected in the "displaying order" 502.

When "order of creation time/date of document" is set, the documents are arranged in such a manner that the documents are sorted on the basis of the time/date of "creation time/date" in a document table, which will be described hereinafter, as a reference. When "order of updating time/date of document" is set, the documents are arranged in such a manner that the documents are sorted in order of the values of "updating time/date" in the document table. When "order of inputting time/date to folder" is set, the documents are sorted on the basis of the time/date, as a reference, at which the document was input to each folder. Specifically speaking, the values of "inputting time/date to folder" in a document table of FIG. 8 are used as a reference.

For example, in the case of using the document management system as a simple document depository, it is sufficient to sort the documents on the basis of the information, as a reference, of the creation time/date and the updating time/date of the file. However, in the case where the business such as a workflow or the like is realized by a plurality of users by using the folder movement, if the documents are arranged in "order of creation time/date of document" and in "order of updating time/date of document", there is a case where the layout of the documents in the folder of each person in charge are set in such a manner that a layout of the documents which are newly input is mixed to the layout of the existing documents. However, if the displaying order is set to "order of inputting time/date to folder", since the documents are arranged in the folder in moving order of the documents which were moved, the new documents can be easily discriminated.

Figure 6:
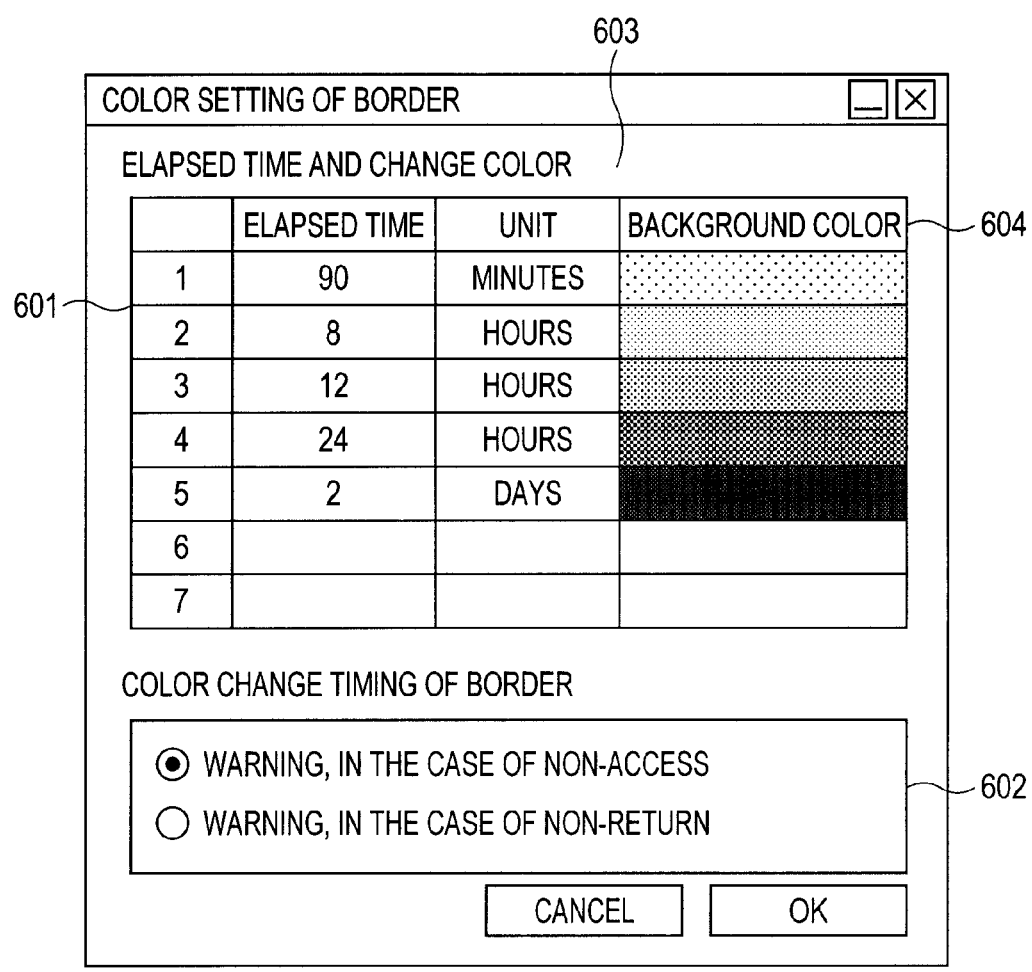
FIG. 6 is a details setting display screen of the displaying order of the folder in the embodiment of the invention.

FIG. 6 is a display screen which is displayed when the "details setting" button 503 in FIG. 5 is clicked. In a table of "elapsed time and change color" 601, to which color the color is changed after what time elapsed from the inputting time/date to the folder is set. In a column of "unit" 603, one of "minutes", "hours", and "days" can be set. In a column of "background color" 604, when it is clicked, "color pallet" to select the color is displayed and an arbitrary color can be set.

In "color change timing of border", either "warning, in the case of non-access" or "warning, in the case of non-return" can be set.

Although the embodiment has been constructed so that the setting of the folder displaying order is made by the server terminal 102, it is also possible to construct in such a manner that the folder displaying order is set by the client terminal 101 and data of setting information is transmitted from the client terminal 101 to the server terminal 102. The folder displaying order may be set in common among the users who use document management software or it is also possible to construct in such a manner that the setting can be changed every user who connects.

FIG. 7 illustrates an example of "folder table" in which folder information in the document management system is held. The folder table of FIG. 7 has been held in the server terminal 102.

The folder table is constructed by a folder ID, a folder name, displaying order, a change timing, and an elapsed time and change color. The folder ID is an ID to unconditionally identify the folder in the cabinet. The folder name is a name of the folder. The displaying order is arranging order of the document list of the folder. The value set in 502 is held. The change timing and the elapsed time and change color are stored only when the displaying order is "order of inputting time/date to folder". The value is decided on the display screen of FIG. 6. As for the change timing, when the value which is set in 602 is "warning, in the case of non-access", "non-access" is held. When it is "warning, in the case of non-return", "non-return" is held.

In "elapsed time and change color", the value which is set in 601 is held. For example, as for a format, information of the elapsed time-unit-background color is held as text data like "90min-#ffc0cb" in such a manner that the elapsed time is expressed by a numerical value, the unit is expressed by an English letter, and the background color is expressed by a hexadecimal notation of the color sample defined in HTML.

An access right has been set for each folder. The user (user ID) who accesses the folder has been set.

When the access right is set to each folder, the folder which can be accessed has been predetermined every person in charge. Such an operation that the person in charge always accesses the same folder is executed. The system has been set so that the user serving as an administrator can access all of the folders. If the system has been set as mentioned above, if the document stored in a certain folder was erroneously stored, the person in charge notifies the administrator of such a fact and moves the document to the folder of the correct person in charge.

In such a case, if the displaying order of the thumbnail images is "order of inputting time/date to folder", the document which should inherently be input to the folder and processed before (for example, which should be returned by the FAX or the like) is processed later. Therefore, when the time exceeds a predetermined elapsed time, if the image is emphasis-displayed, the delay of the work can be reduced.

The system can be also set in such a manner that the access right to each folder is arbitrarily set and each user (person in charge) can access each folder. In this case, each user can also move the document which has erroneously been stored in his own folder to the folder of another user.

FIG. 8 illustrates an example of a "document table" in which the document information in the document management system is held. The document table of FIG. 8 has been held in the server terminal 102.

The document table is constructed by a document ID, a document name, a creation time/date, an updating time/date, an accessing time/date, a storage destination folder ID, an inputting time/date to folder, a document thumbnail, and an end of process. The document ID is an ID for unconditionally identifying the document in the cabinet. The document name is a name of the document. The creation time/date indicates a time/date at which the document was registered in the document management system. The updating time/date indicates a time/date at which the user of the document management system updated the document at last. The accessing time/date indicates a time/date at which the user accessed the document at last.

In the embodiment, the creation time/date is assumed to be the time/date at which the document was registered in the document management system. However, it can be also set to the time/date at which the document was received by the FAX. That is, the creation time/date is the time/date at which the document data was processed and it is sufficient that the creation time/date is the time/date serving as a reference. Therefore, the creation time/date is not limited to the time/ date at which the document data was actually formed or the time/date at which the document was registered in the document management system.

The storage destination folder ID is an ID showing just under which folder the document has been held. As for the value, one of the values in the "folder ID" column in the folder table is written. The "inputting time/date to folder" indicates a time/date at which the document was held in the folder. When the user moves the document to a different folder in the document application, the "accessing time/date" and the "inputting time/date to folder" of the document are updated. "storage destination folder ID" is changed to "folder ID" showing the folder after the movement. In "document thumbnail", the thumbnail data (thumbnail image) of the document has been held. "end of process" is a process end flag which is automatically allocated after a series of workflow of the document is finished.

As for the workflow, it is assumed that a route (acceptor) who accepts the document has been stored (set) in a definition file and with respect to the document accepted by this route (accepted by each acceptor), it is determined that the workflow was finished. This workflow is started when the user who has accessed the folder designates the document which is executed by the workflow, sets the acceptor, and executes the workflow.

The constructions and contents of various kinds of tables are not limited but, naturally, they are formed by various kinds of constructions and contents in accordance with an application and an object.

A setting process of the thumbnail displaying order at the server terminal 102 in the embodiment will be described hereinbelow with reference to a flowchart of FIG. 9 and the folder table of FIG. 7.

At the server terminal 102, when the administrator activates the document management system (software), selects the folder which he wants to set the thumbnail displaying order (S1201), and selects a "setting of displaying order of folders" menu (not shown) or the like, a setting display screen of the folder displaying order in FIG. 5 is displayed. In 501, the folder name selected in S1201 by the administrator is automatically displayed. The arranging order of the thumbnail images of the folder is set to one of "order of creation time/date of document", "order of updating time/date of document", and "order of inputting time/date to folder" (S1202). When it is set to "order of inputting time/date to folder", the "details setting" button 503 is clicked and "color setting of border" is performed.

Desired values are set into the elapsed time, the unit, and the change color in 601. A desired value is set into the color change timing of the border in 602. The "non-access" state denotes a state where the document has been registered (input) into the document management system and is never accessed from the user. Specifically speaking, it denotes a state where "creation time/date" and "accessing time/date" in the document table are identical.

The "non-return" state denotes a state where the document has been registered (input) into the document management system and the series of workflow is not finished. Specifically speaking, it denotes a state where the "end of process" record in the document table is "0". The set values are held in the folder table of FIG. 7.

A registering process of the document at the server terminal 102 in the document management system of the embodiment will be described hereinbelow with reference to a flowchart of FIG. 10 and a document table of FIG. 8.

As a document which is registered into the document management system, the electronic document is received at the server terminal 102 by the FAX 105 from the external (another) FAX (S1101).

The document is opened to the user (person in charge) after it was stored into the folder of the document management system. The storage destination folder is determined in step S1102. The folder at this time is a folder which has already been formed in the document management system and in which the document is stored first. The administrator accesses this folder and moves the document to the folder of the person in charge.

A new record is formed in the document table of FIG. 8 in step S1103. The document ID is newly allocated and an arbitrary document name is allocated as a document name. As for the creation time/date, updating time/date, accessing time/date, and inputting time/date to folder, the time/date at which the document was received is recorded. As a storage destination folder ID, the folder ID of the folder serving as a document storage destination decided in S1102 is held. The thumbnail image of the document is formed and held in the document thumbnail. "0" is written as an initial value in the end of process.

As for the folder ID, when the document is moved to the folder of the person in charge, the folder ID of the moved folder is stored. Processes which are executed when the document is moved will be described in detail with reference to FIG. 11.

Subsequently, a document displaying process in the folder in the document management system in the embodiment will be described with reference to FIG. 12.

First, in the document management system, when the user (person in charge) executes the document management software installed in the client terminal 101, he accesses the server terminal 102 and allows a display screen of the document management software which has displayed a folder layer (repository display area 304) to be displayed in the display unit 210 with reference to the folder table (FIG. 7). At this time, the folder ID is obtained from the server terminal 102 and stored into the RAM 203 of the client terminal 101.

After the display screen of the document management software was displayed in the display unit 210, in the repository display area 304 of the main window 301, the client terminal accepts the selection of the folder which displayed the document from the user (S1401). The client terminal obtains the folder ID of the selected folder (S1402) and transmits to the server terminal 102 (S1403). The server terminal 102 receives the folder ID (S1404), refers to the folder table (FIG. 7), and obtains the folder setting information including the displaying order of the folder (displaying order information to decide the displaying order), the change timing, and the elapsed time and change color from the record which coincide with the folder ID (S1405).

Records of all of the documents (documents whose folder IDS coincide) held under the folder are obtained from the document table (FIG. 8) and their values are set to document list information (S1406). The information obtained in S1405 and S1406 (the folder setting information including the displaying order information to decide the displaying order and the document list information) is transmitted from the server terminal 102 to the client terminal 101 (S1407).

The client terminal 101 receives the folder setting information and the document list information (S1408). The received folder setting information and document list information are stored into the RAM 203 of the client terminal 101.

The value of "displaying order" in the received folder setting information is referred to (the displaying order information is obtained) (S1409). In the case of the order of creation time/date of document, the document list information is sorted in ascending order of the document creation time/date in the document table (S1410). In the case of the order of updating time/date of document, the document list information is sorted in ascending order of the document updating time/date in the document table (S1411). In the case of the order of inputting time/date to folder (storage time/date information), the document list information is sorted in order of inputting time/date to folder in the document table, that is, in order from the old inputting time/date (S1412), thereby forming a border of the document (S1413). The process in S1413 will be described in detail hereinafter with reference to FIG. 13.

The border of the document formed and the thumbnail image of the document which is obtained from the document table are overlaid, thereby forming a thumbnail image with the border (S1414). The thumbnail image of the document of the folder is displayed in the document display area 305 as illustrated in FIG. 14 (S1415).

Figure 14:
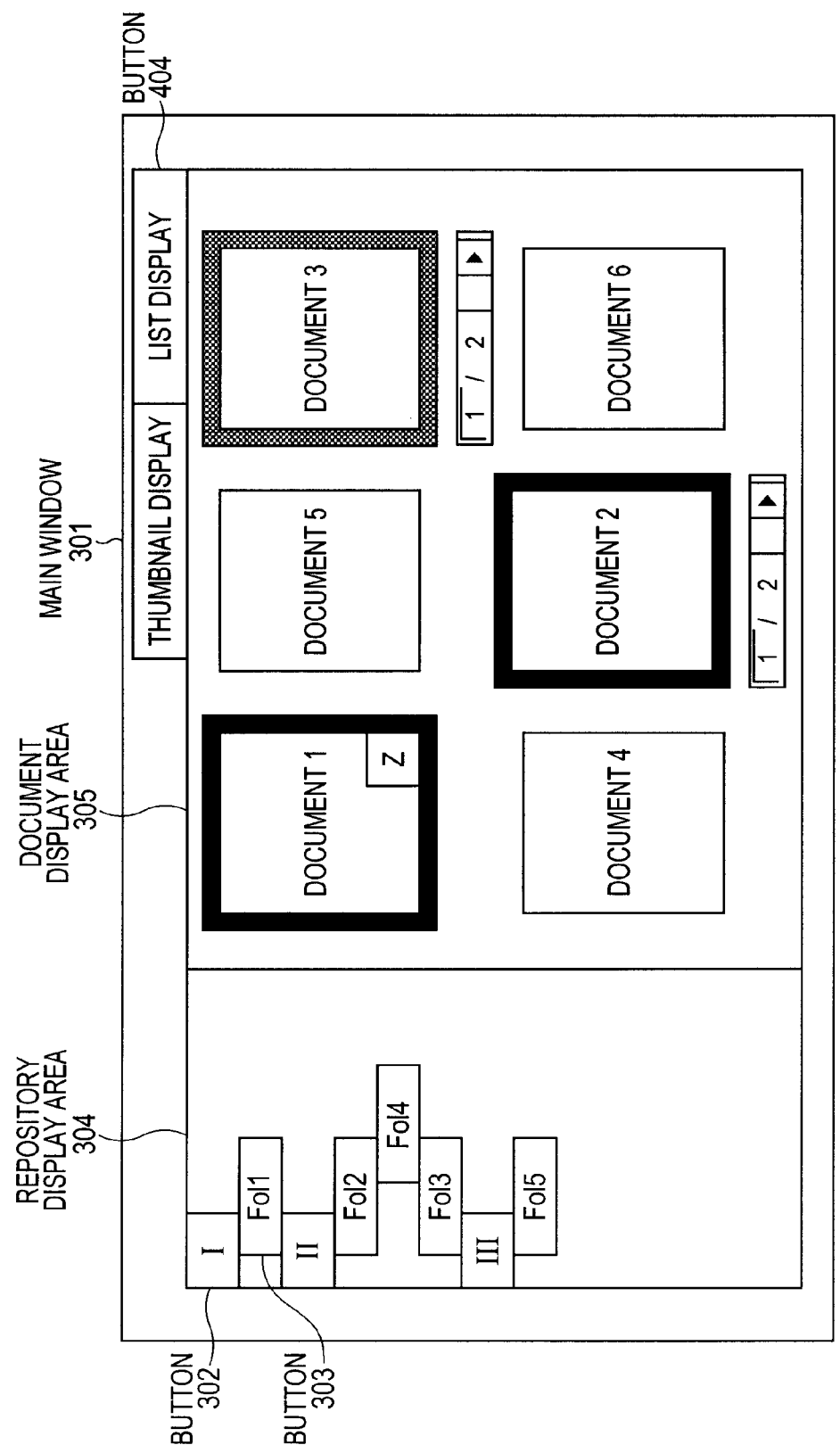
FIG. 14 is a diagram illustrating a schematic construction of a user interface after the border color of the thumbnail in the display of the folder was changed in the document management system in the embodiment of the invention.

When the button 404 showing the list display is pressed in FIG. 14, the list of document information is displayed in the list display format instead of the thumbnail format in which the thumbnail images of the documents are displayed. Also in this case, when the sorting order is the order of inputting time/date to the folder, in a manner similar to the thumbnail images of the documents, the documents in which a predetermined time (time set in S1202) has elapsed from the document creation time/date can be displayed (distinction display) so as to be emphasized more than the documents in which the predetermined time does not elapse. In this case, the color of the record is changed according to the set color and the list is displayed.

Although the bordering process is executed in S1413 when the displaying order is the order of inputting time/date to the folder in the embodiment, the bordering process of S1413 may be executed also in the case where the displaying order is the order of creation time/date or the order of updating time/date.

The changing process of the border of the thumbnail image in the document management system of the embodiment in S1413 will be described hereinbelow with reference to FIG. 13.

Figure 12:
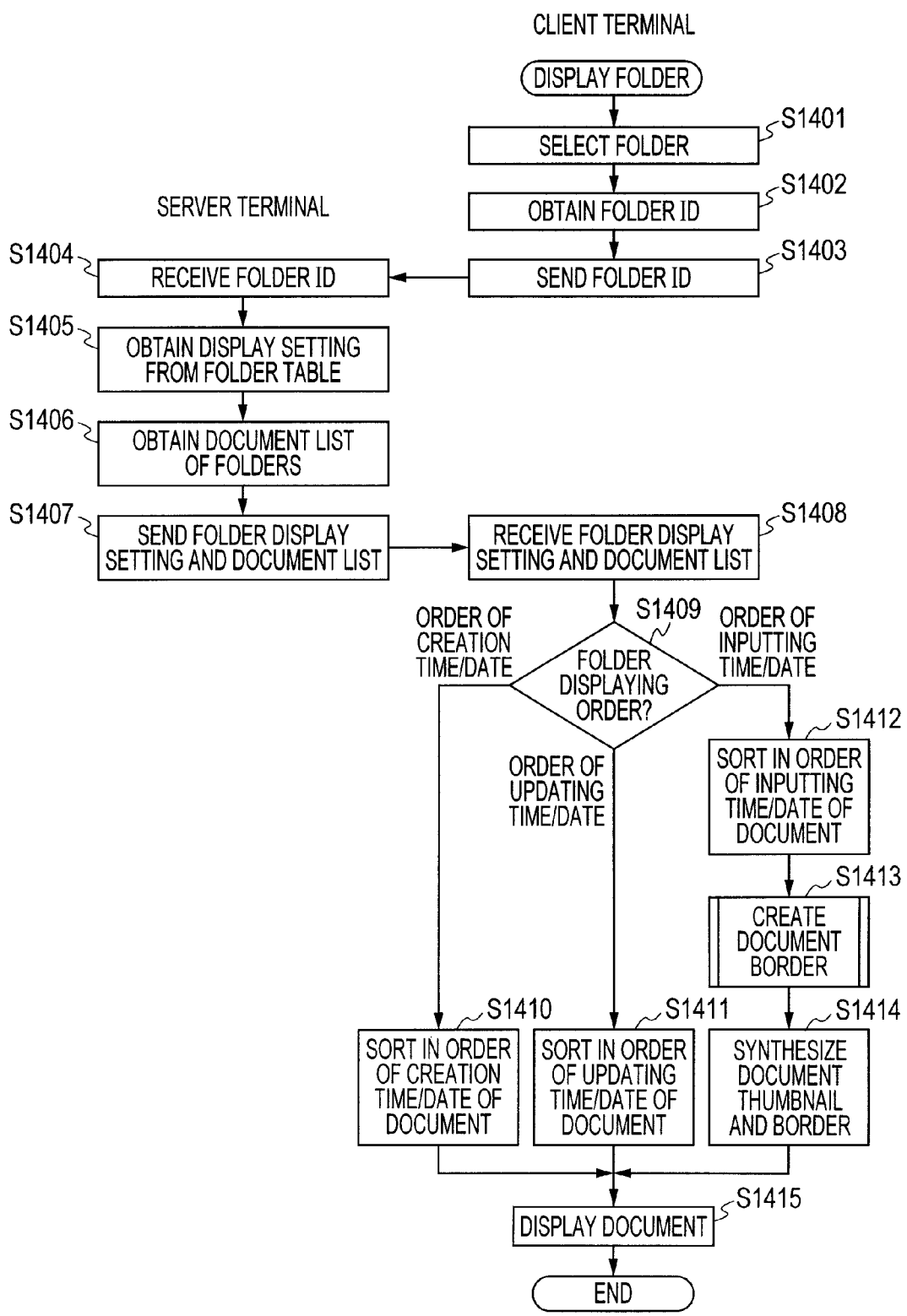
FIG. 12 is a flowchart illustrating an example of a document displaying procedure in a folder of the document management system in the embodiment of the invention.

If the folder displaying order of the folder designated by the client terminal 101 in S1409 in FIG. 12 is the setting of "sort in order of inputting time/date of document", the change timing and the elapsed time and background color in the folder setting information of the folder are obtained (color information obtainment) (S1501). The client terminal 101 discriminates whether or not the setting value of the change timing is non-access or non-return (S1502). If it is "non-access", the processing routine advances to S1503 and the non-access document is extracted from the document list information stored in the RAM 203 (S1503).

The "non-access" state denotes a state where the document has been registered (input) to the document management system and there are no accesses from the user. Specifically speaking, since the document is a document in which "creation time/date" and "accessing time/date" in the document table are identical, it indicates the document of the document ID "00004" in the document list information in FIG. 15.

Subsequently, the elapsed time of the document which was determined to be the non-access document is obtained (S1505). A time difference between the present time and the document creation time/date is obtained. Whether or not the elapsed time (predetermined elapsed time) in the folder setting information has passed is discriminated in accordance with the time difference. If the predetermined elapsed time has passed, an image for bordering is formed by using the change color in the folder setting information (S1506).

More specifically speaking, in the case of FIG. 15, if the present time is "2009/11/25 8:00", the time difference is equal to "2009/11/25 8:00"–"2009/11/25 0:00"="8 hours", that is, a time of 8 hours has passed. Therefore, an image in which the color of the second record is set to the border color is formed.

If the change timing is "non-return" in S1502, the processing routine advances to S1504 and the non-return document is extracted from the document list information stored in the RAM 203.

The "non-return" state denotes a document (non-processed document) in which the document has been registered (input) to the document management system and the series of workflow is not finished (completed). Specifically speaking, the "end of process" record in the document table is equal to "0". Therefore, the non-return documents indicate documents of the document IDs "00001" and "00004" in the document list information in FIG. 15. The elapsed time of the document is obtained in S1405. In the case of the document ID "00001" in FIG. 15, if the present time is "2009/11/25 8:00", the time difference is equal to "2009/11/25 8:00"–"2009/11/20 0:00"="4 days and 8 hours", that is, a time of 4 days and 8 hours has passed. Therefore, an image in which the color of the first record is set to red is formed (S1506).

That is, whether or not the workflow has been finished is discriminated. An image whose color has been set so as to emphasis-display the document in which the predetermined time has passed (over the elapsed time from the creation time/date) among the non-processed documents in which the workflow is not finished is formed. The document in which the elapsed time does not pass yet is not emphasis-displayed.

The workflow process will be described hereinafter. In the workflow process, whether or not the workflow has been finished can be discriminated by referring to a document table of FIG. 17 on the basis of processing steps, which will be described hereinafter. When the processing state is equal to 0 or 2, it is determined that the workflow is not finished. When the processing state is equal to 1, it is determined that the workflow has been finished.

The color-set image is formed as follows. For example, a rectangle which is larger than the thumbnail image of the document by about 2 mm in each of the upper, lower, right, and left directions (which can be also controlled by the number of pixels) is formed and an image in which the border color has been set as a background color is formed.

A moving process of the document management system of the embodiment will be described hereinbelow with reference to FIG. 11.

Figure 11:
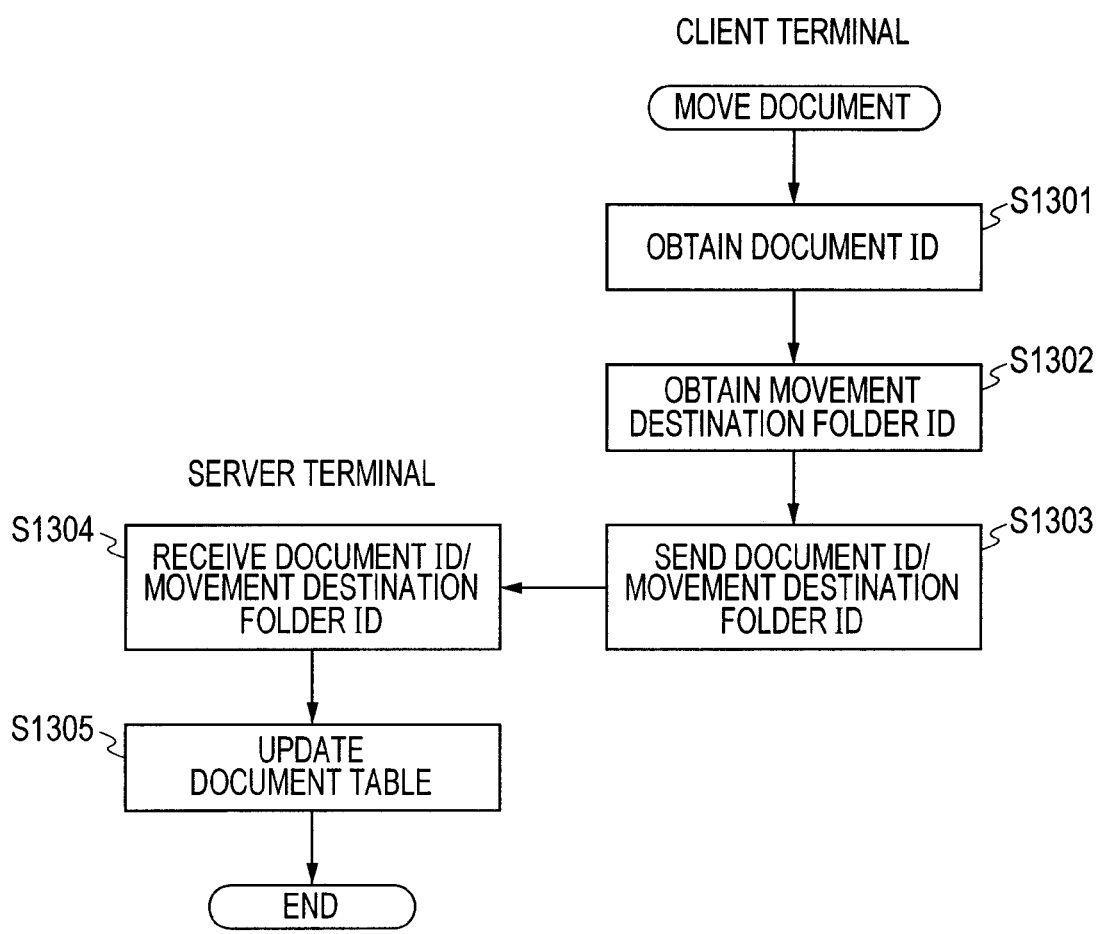
FIG. 11 is a flowchart illustrating an example of a moving procedure of the document of the document management system in the embodiment of the invention.
Figure 13:
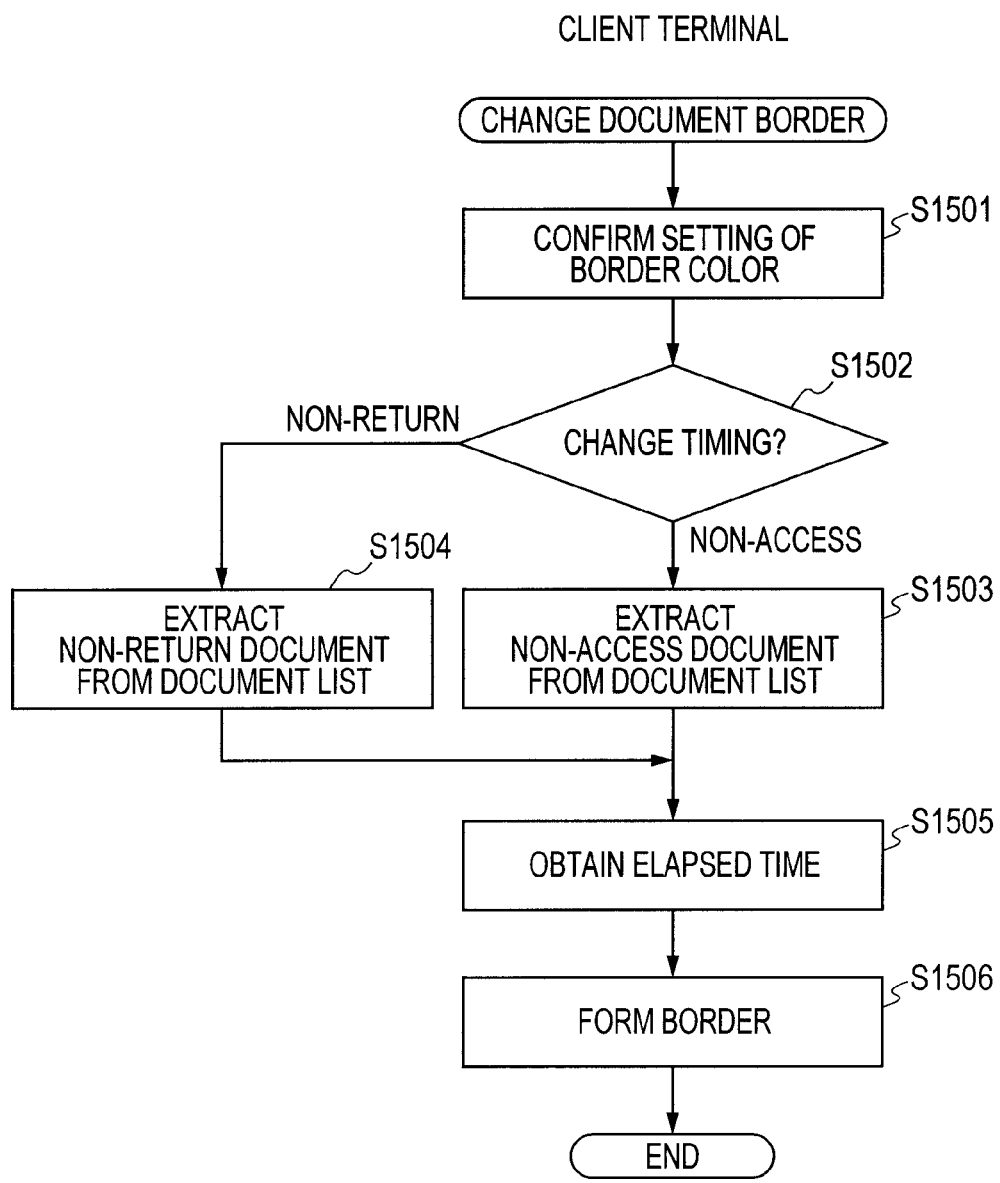
FIG. 13 is a flowchart illustrating a procedure for changing a border color of a thumbnail in the display of the folder in the document management system in the embodiment of the invention.

The process of FIG. 11 is executed according to the operation of the user (the person in charge or the administrator) after the documents were displayed in the thumbnail format or the list format in the process of FIG. 13.

When the document managed by the document management software (hereinbelow, referred to as a movement document) is moved to another folder in the document management software, in the client terminal 101, in a manner similar to the case of the movement of the document in "Windows" (registered trademark), the movement document is selected in the document display area 305. The movement of this document is instructed by the drag and drop operation to the movement destination folder (for example, the button 303) in the repository display area 304.

When the movement instruction is detected, the "document ID" of the movement document selected in the client terminal 101 is obtained in S1301 and the "folder ID" of the movement destination serving as a movement destination of the movement document is obtained in S1302. The document ID and the folder ID are transmitted from the client terminal 101 to the server terminal 102 in S1303. The server terminal 102 receives the document ID and the folder ID (S1304).

By referring to the record in the document table (FIG. 8) whose "document ID" coincides, the updating time/date, accessing time/date, and inputting time/date to folder are updated to the time/date information at the present time point. The storage destination folder ID is updated to the "folder ID" received in S1304 (S1305). After that, in the document display area 305 of the client terminal 101, the thumbnail image of the movement document is not displayed in the folder of the moving source but is displayed in the folder of the movement destination.

Subsequently, the foregoing workflow process will be described in detail. The workflow process will be described hereinafter with respect to an accepting flow, as an example, which is executed before the person in charge returns by using a document via a FAX. In this example, when the FAX return is performed, if the acceptance by the acceptor is not performed, a mechanism adapted to disable the person in charge to perform the FAX return is provided, thereby enabling the person in charge to perform the FAX return after the accepting process was executed by the acceptor. After completion of the FAX return, the workflow is finished and the emphasis display of the thumbnail image is also simultaneously finished.

Since E-mail is used as a communicating unit between the person in charge and the acceptor, it is assumed that a general E-mail server (not shown) exists in the network and general E-mail transmission and reception software is operating in the terminal of the person in charge and the terminal of the acceptor.

FIG. 16 is an example of a "folder table" which holds the folder information at the server terminal 102 in the document management system and the diagram shows the table corresponding to FIG. 7. In an example of an accepting flow, which will be described hereinafter, it has a "user ID".

The item "user ID" in FIG. 16 is a user ID of the person in charge of the corresponding folder and is ID information to identify the user in the document management system. It is assumed that this item is set by either a method whereby when "folder table" is updated by "setting of folder displaying order" in FIG. 5, the user ID of the user who updated is automatically set or a method whereby it is preset by the system administrator.

FIG. 17 is an example of a "document table" which holds the document information at the server terminal 102 in the document management system and the diagram shows the table corresponding to FIG. 8. In the example of the accepting flow, which will be described hereinafter, the item "end of process" of FIG. 8 is replaced by the item "processing state" in FIG. 17 and the accepting flow is managed.

The item "end of process" in FIG. 8 is an item of a binary selection type in which a state where the workflow is not finished is expressed by "0" and a state where the workflow has been finished is expressed by "1". On the other hand, an item "processing state" in FIG. 17 is an item of a ternary selection type in which a state where the acceptance is not made yet in the workflow is expressed by "0", a state where the acceptance has been made is expressed by "2", and a state where the workflow has been finished is expressed by "1". An initial state of the item "processing state" is equal to "0" showing "non-acceptance".

FIG. 18 is an example of "user table" which holds the user information in the document management system.

An item "user ID" in FIG. 18 is unique ID information to identify all of the persons in charge and acceptors who use the document management system. An item "E-mail address" is an E-mail address of the relevant user. An item "user ID of superior (acceptor)" is a user ID of the user (acceptor) having an acceptance authority to the relevant user. Each item shown here is an example and only the items which are concerned with the embodiment are presented. Besides those items, items necessary for the user management in the document management system exist. It is assumed that this table has been preset by the system administrator.

FIG. 19 is an example of an "accepting process table" which holds the information of the accepting process in the document management system.

An item "process ID (workflow ID)" in FIG. 19 is a unique identification number to distinguish the record which is formed each time there is an application for acceptance. An item "document ID of acceptance target document" is a document ID of the document serving as a target of the acceptance in the acceptance application and is expressed by "document ID" in the document table of FIG. 17. An item "user ID of applicant" is a user ID of the person in charge (for example, log-in user to the document system) who made the application for acceptance and is expressed by "user ID" in the user table of FIG. 18. An item "result" is information showing a result of the accepting process and is an item of a ternary selection type in which "non-process" is expressed by "0", "acceptance" is expressed by "1", and "denial" is expressed by "2". Since the record in this table is added when the person in charge has made the application for acceptance, there are no records at first. However, each time the application is made, the record is added.

Subsequently, an example of the accepting flow in the workflow will be described with reference to the drawings.

Figure 24:
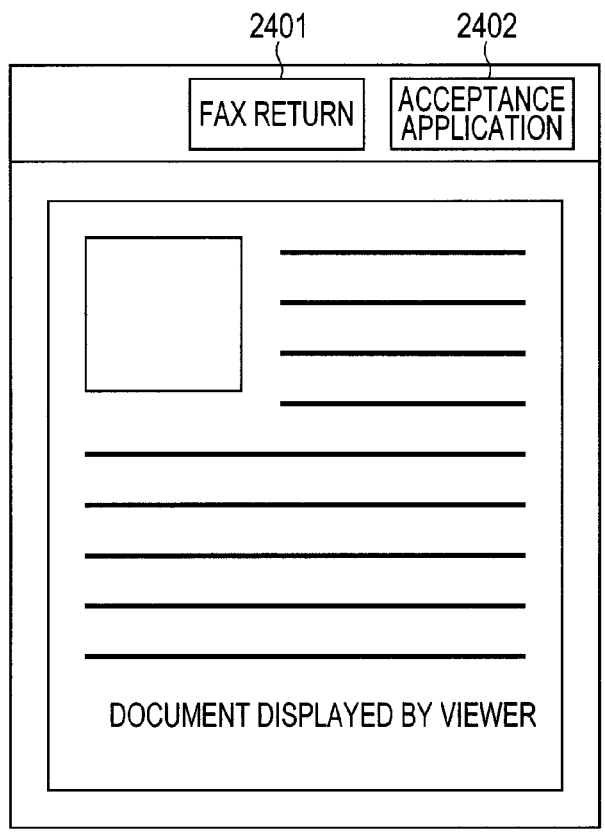
FIG. 24 is a diagram illustrating a schematic construction of a user interface of a terminal of a person in charge of the operation in the display of contents of the document in the document management system in the embodiment of the invention.

In a FAX order-receiving business for receiving an order by the FAX, the person in charge of the business selects a document to be processed from the documents in his own folder in FIG. 14 and opens the document for the business. At this time, an example of a viewer display screen which displays the contents of the opened document is illustrated in FIG. 24. More specifically speaking, the document list by the thumbnail images is displayed in S1415. When the user opens (executes) the document by double-clicking the thumbnail image, the client terminal 101 issues a document obtaining request (transmits the document ID) to the server terminal 102 and receives the designated document from the server terminal 102. Thus, a document is displayed to the display unit of the client terminal 101 as illustrated in FIG. 24.

Figure 20:
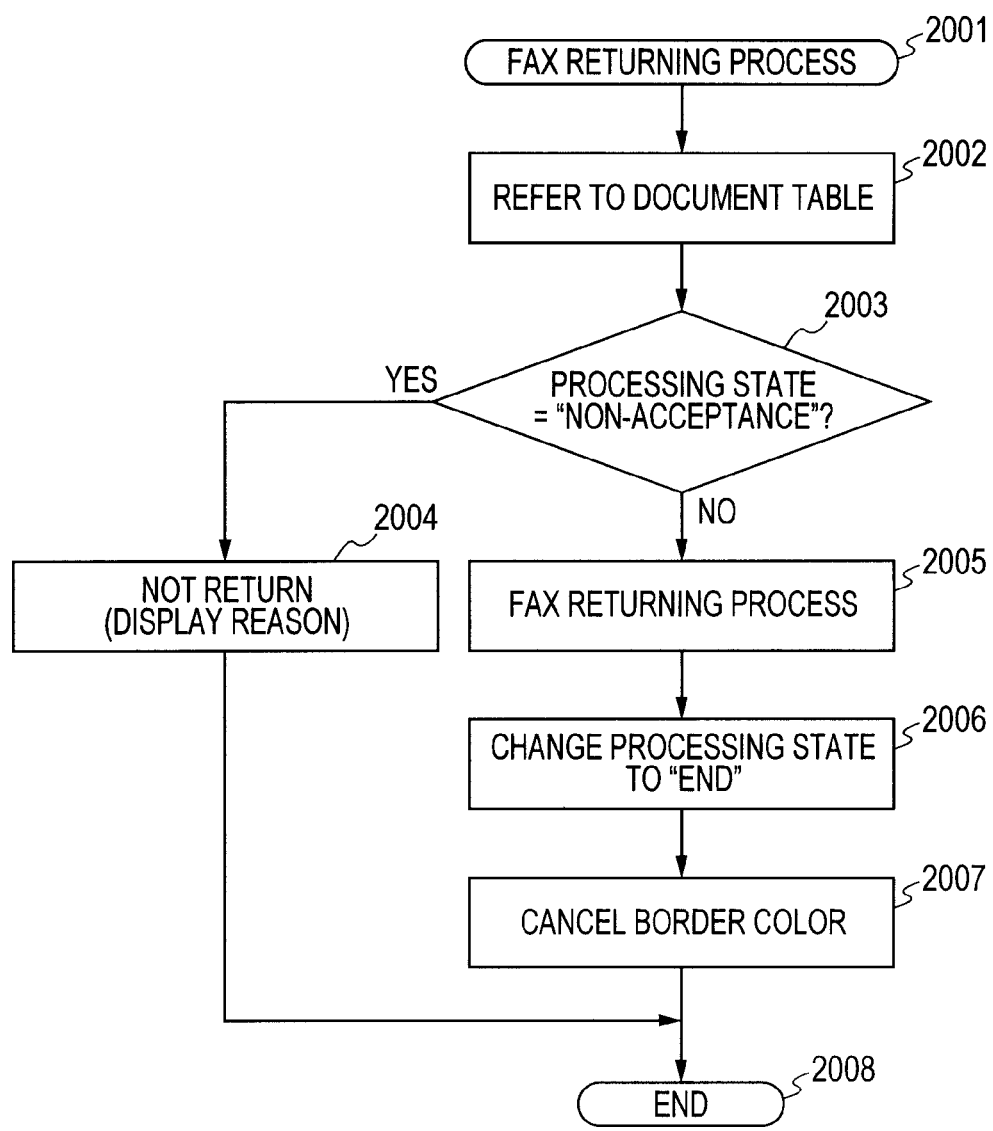
FIG. 20 is a flowchart showing an example when the document is FAX-transmitted in the document management system in the embodiment of the invention.
Figure 21:
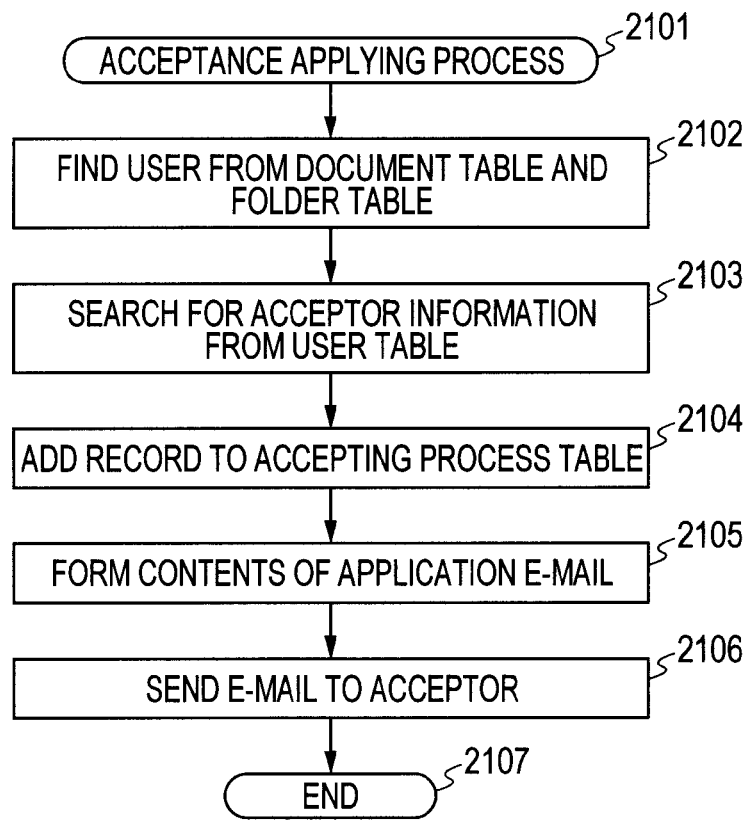
FIG. 21 is a flowchart showing an example when an acceptance application of the document is performed in the document management system in the embodiment of the invention.

The contents of the document are displayed in FIG. 24. The person in charge executes the business while looking at such a display screen. Buttons 2401 and 2402 are arranged on the display screen. By pressing the button 2401, processes of a flowchart of FIG. 20 are executed. By pressing the button 2402, processes of a flowchart of FIG. 21 are executed.

FIG. 20 is a flowchart for a FAX returning process and shows the process which is executed in the case where when the person in charge clicks the button 2401 in FIG. 24 at his own client terminal 101, the displayed document is FAX-transmitted by using a FAX driver of the client terminal 101. In the case of the workflow process, the document table of FIG. 8 which is used in step S1408 is replaced to the document table of FIG. 17 and a description will be made.

The processing routine starts from step 2001. In step 2002, the client terminal 101 refers to the document list information obtained from the document table of FIG. 17 in accordance with the document ID (document ID whose FAX transmission has been instructed) of the displayed document and searches for the record having the document ID of the relevant document.

In step 2003, the client terminal 101 discriminates about a branch according to the contents of the item "processing state" in the record searched for by the document list information. If the acceptor does not accept, since its value is equal to "0" showing "non-acceptance", the processing routine advances to step 2004 in such a case.

Since the value is equal to "0", the client terminal 101 does not execute the returning process in step 2004 but progresses to step 2008. At this time, a message for notifying the person in charge of the non-acceptance or the like is displayed on the display screen of the display unit of the client terminal 101. It is assumed that processes in step 2005 and subsequent steps in the case where the acceptance was performed will be described after the description of the subsequent application for acceptance and the accepting process of the acceptor for convenience of explanation of describing order.

When the acceptance by the acceptor is not performed, since the person in charge cannot perform the FAX return, it is necessary to make the acceptance application in order to obtain the acceptance for return. Such an operation can be executed by clicking the button 2402 in FIG. 24.

FIG. 21 is a flowchart for an acceptance applying process. When the person in charge clicks the button 2402 in FIG. 24 at his own client terminal 101, an acceptance applying request including the document ID is transmitted to the server terminal 102 and the acceptance applying process is executed in the server terminal 102.

The process is started in step 2101. In step 2102, the server terminal 102 refers to the document table of FIG. 17 in accordance with the received document ID and searches for the record having the document ID of the relevant document. Subsequently, the folder table of FIG. 16 is searched by using the item "storage destination folder ID", as a key, in the record searched for in the document table. The user ID of the person in charge is obtained from the item "user ID" in the record searched for in the document table.

In step 2103, the server terminal 102 refers to the user table of FIG. 18 and searches for the record having the user ID of the person in charge from the item "user ID of superior (acceptor)" in the searched record in the user table. Subsequently, the user table of FIG. 18 is searched again by using the user ID of the acceptor as a key. An E-mail address of the acceptor is obtained from the item "E-mail address" in the searched record (record whose user ID of the acceptor coincides) in the user table. That is, the user ID and the E-mail address of the acceptor are obtained.

In step 2104, the server terminal 102 adds a new record for the current accepting process to the accepting process table of FIG. 19. With respect to each item at the time of addition, a unique value is arbitrarily set to "process ID". The document ID of the document which is displayed at present is set to "document ID of acceptance target document". The user ID of the acceptance applying user obtained in step 2102 is set to "user ID of applicant". The user ID of the acceptor obtained in step 2103 is set to "user ID of acceptor". "0" showing "non-acceptance" is set as an initial value into "result".

In step 2105, the server terminal 102 forms contents of E-mail to be sent to the acceptor. It is assumed that the contents include a text message for requesting the acceptance and contents which have previously been prepared are automatically written as such contents. A link has been adhered to the contents. Such a link is a command for activating an application for acceptance provided for the client terminal of the acceptor. The link has the document ID of the acceptance target document and the process ID set in step 2104 as parameters. Although the command is a command which has previously been prepared, the same parameter as the document ID set in step 2104 is set as a parameter.

In step 2106, the server terminal 102 transmits the E-mail formed in step 2105. A destination of the transmission is the acceptor and the E-mail address is an address obtained in step 2103. It is now assumed that the transmission of the E-mail is based on the general SMTP protocol and it is received and transmitted by the general E-mail server. After that, the process is finished in step 2107.

At the client terminal of the acceptor, the acceptor receives the E-mail of the acceptance application transmitted in step 2106. The client terminal of the acceptor detects an instruction of the link of the E-mail and the application for acceptance is activated. This process will be described with reference to a flowchart of FIG. 22.

Figure 22:
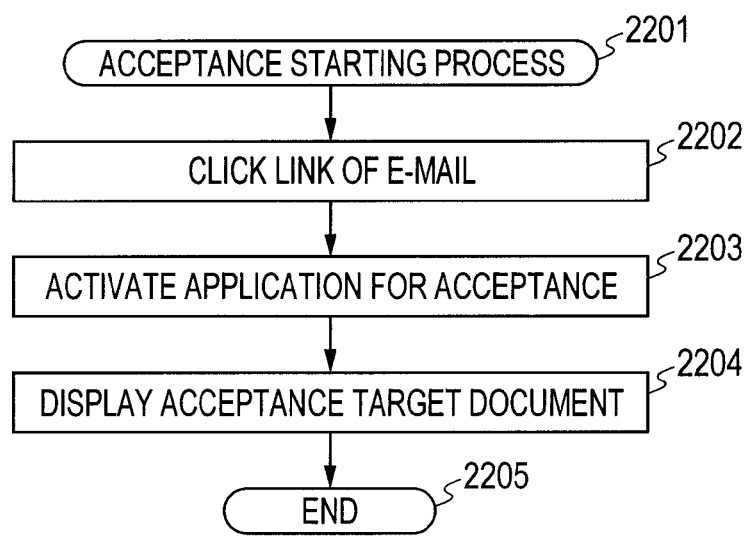
FIG. 22 is a flowchart showing an example when an accepting process of the document is started in the document management system in the embodiment of the invention.

FIG. 22 is a flowchart for an acceptance starting process and is a process which is executed in the client terminal of the acceptor.

In step 2201 in FIG. 22, the process is started. First, in step 2202, the client terminal of the acceptor detects the instruction of the link of the E-mail in accordance with the instruction of the acceptor.

In step 2203, the client terminal of the acceptor activates the application for acceptance by the instructed command of the link. This application may be a client application of the document management system only for the acceptor or may be an add-on program added to the client application of the document management system.

Figure 25:
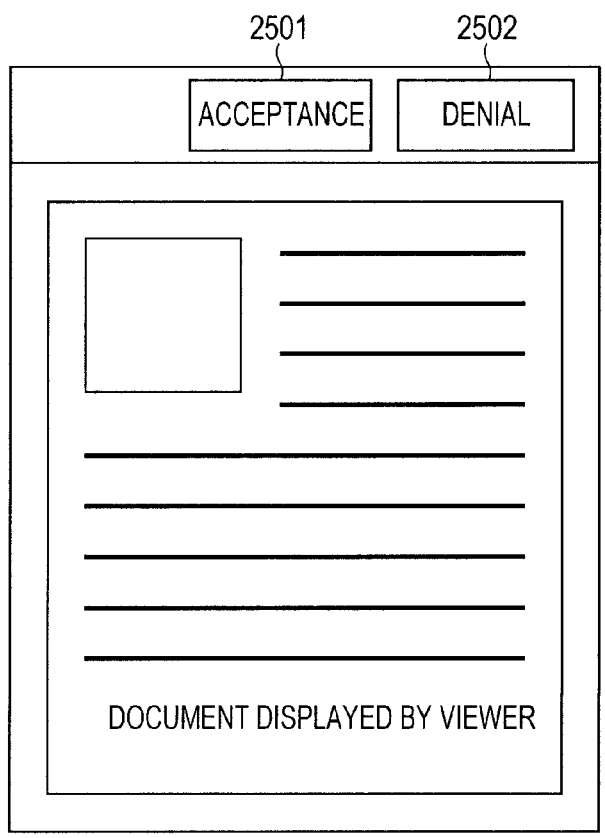
FIG. 25 is a diagram illustrating a schematic construction of a user interface of a terminal of an acceptor in the display of the contents of the document in the document management system in the embodiment of the invention.

In step 2204, the client terminal of the acceptor makes the document obtaining request to the server terminal 102 on the basis of the document ID shown by the parameter by using the application for acceptance, receives the acceptance target document from the server terminal 102, and displays it by a display screen as illustrated in FIG. 25. The process ID as another parameter is held in the RAM of the client terminal of the acceptor. After that, the process is finished in step 2205. Subsequently, the processing routine is returned to the process of FIG. 23.

FIG. 25 is an example of the display screen for displaying the acceptance target document by the application for acceptance. Since the contents of the document are displayed, the acceptor discriminates about "acceptance" and "denial" by looking at the display screen. Buttons 2501 and 2502 are arranged on the display screen. The button 2501 indicates "acceptance" and the button 2502 indicates "denial". When one of those buttons is clicked, processes of a flowchart of FIG. 23 are executed.

Figure 23:
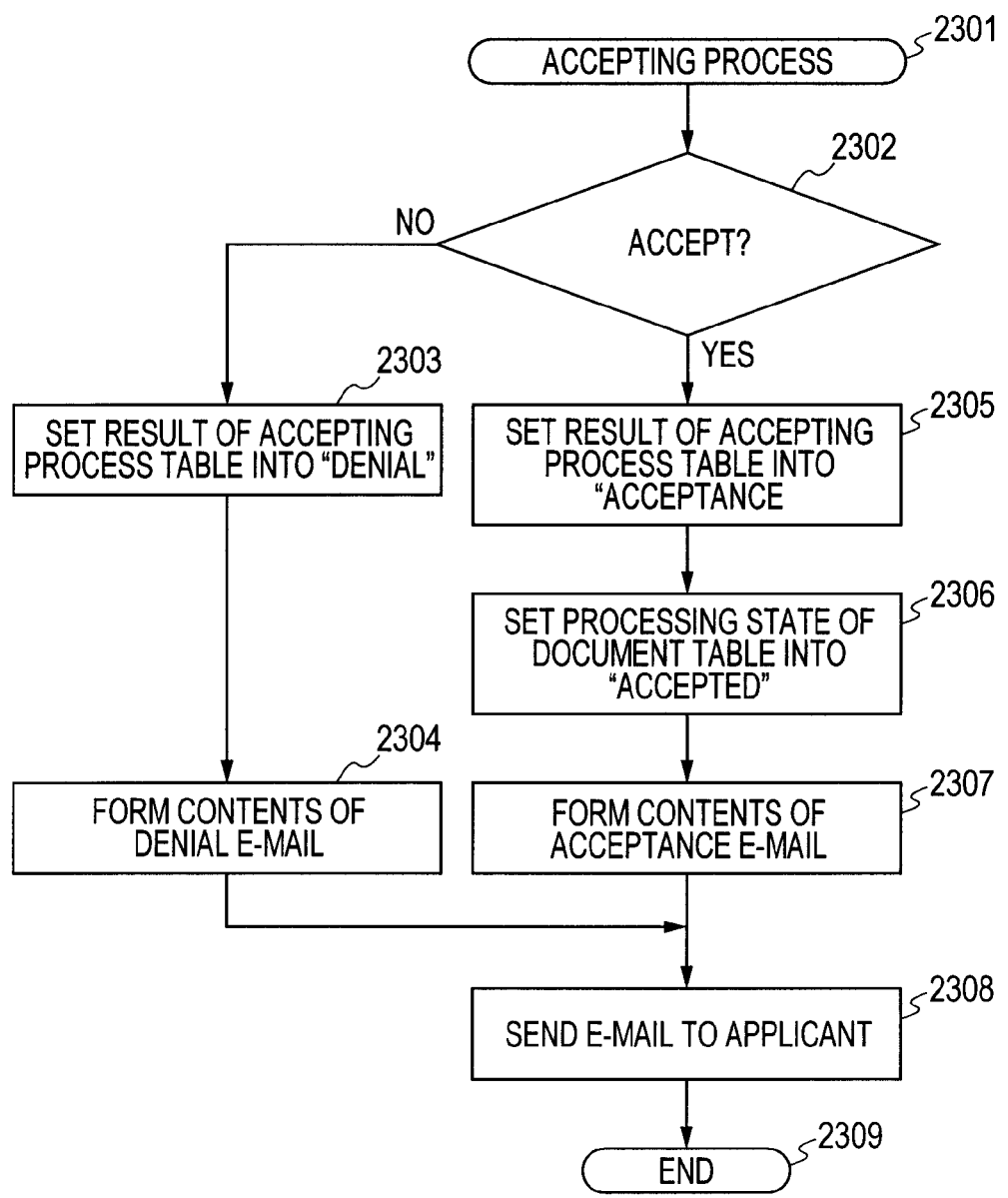
FIG. 23 is a flowchart showing an example when the document is accepted in the document management system in the embodiment of the invention.

FIG. 23 is the flowchart which is executed when the click of the button 2501 or 2502 in FIG. 25 is detected. When the button 2501 is pressed, the accepting request including the process ID is transmitted from the client terminal of the acceptor to the server terminal 102. When the button 2502 is pressed, a denial request including the process ID is transmitted. It is assumed that when the acceptor determines "acceptance" or "denial", he clicks one of the buttons.

The process is started in step 2301. In step 2302, the server terminal 102 receives the accepting request or denial request from the client terminal of the acceptor and discriminates whether or not the acceptor has clicked the button of either "acceptance" or "denial". If the server terminal 102 received the accepting request, the processing routine advances to step 2305. If the denial request is received, step 2303 follows.

In step 2303 in the case where the acceptor received the denial request, the server terminal 102 searches the accepting process table of FIG. 19 by using the received process ID as a key. A value "2" showing "denial" is set to the item "result" of the searched record.

In step 2304, the server terminal 102 forms contents of E-mail which is notified to the person in charge who applied for "denial". The contents may be preliminarily prepared or may be input by the acceptor from an input display screen on the client terminal of the acceptor. The E-mail address of the destination can be obtained from the user table by using the item "user ID of applicant", as a key, in the record which was searched for in step 2303. After the E-mail was formed, the processing routine advances to step 2308. However, step 2305 in the case where the acceptance was performed and subsequent steps will be described first.

In step 2305 in the case where the acceptance was performed, the server terminal 102 searches the accepting process table of FIG. 19 by using the received process ID as a key. A value "1" showing "acceptance" is set to the item "result" of the searched record.

In step 2306, the server terminal 102 searches the document table of FIG. 17 by using the document ID shown by the item "document ID of acceptance target document" in the record which was searched for in step 2305 as a key. A value "2" showing "accepted" is set to the item "processing state" of the searched record.

In step 2307, the server terminal 102 forms contents of E-mail showing "accepted". The contents may be preliminarily prepared or may be input by the acceptor from the input display screen on the client terminal side of the acceptor. The E-mail address of the destination can be obtained from the user table by using the item "user ID of applicant", as a key, in the record which was searched for in step 2305.

In step 2308, the server terminal 102 transmits the E-mail showing "acceptance" or "denial" to the person in charge who applied for. It is now assumed that the transmission of the E-mail is based on the general SMTP protocol and it is received and transmitted by the general E-mail server. After that, the process is finished in step 2309.

When the E-mail transmitted from the server terminal 102 is received at the client terminal 101, in the case of "denial", a correction is made by the person in charge and the client terminal executes the acceptance applying process. In the case of "acceptance", the client terminal detects the click (instruction) of the button 2401 in FIG. 24 and executes the FAX returning process.

Since the flow at the time of "non-acceptance" has been described above with respect to the flowchart of FIG. 20, a flow in the case of "accepted" will be described here.

As mentioned above, the processing routine starts from step 2001. In step 2002, the client terminal 101 refers to the document list information obtained from the document table of FIG. 17 and searches for the record whose document ID coincides.

In step 2003, the client terminal 101 discriminates a branch in accordance with the contents of the item "processing state" in the searched record. If the acceptor accepted, since its value is equal to "2" showing "accepted", the processing routine advances to step 2005 in this case. In the case of "non-acceptance", step 2004 follows. However, the process in this case has already been mentioned above, its description is omitted here. If the value is equal to "1" showing "end of process", step 2005 follows and processes similar to those in the case of "accepted" are executed. This is because it is intended to cope with such a situation that even after completion of the workflow, the user wants to perform the FAX transmission again due to some reasons.

The embodiment has been constructed in such a manner that in the case where the FAX returning process was executed, the processing state is changed to "end" and whether or not the workflow has been completed is discriminated. However, it is also possible to construct in such a manner that the processing state is changed to "accepted" in step 2305, which will be described hereinafter, and in the case of "accepted", the workflow is completed.

As mentioned above, in the embodiment, whether or not the workflow has been completed is discriminated. If the workflow has been completed, the thumbnail image is not emphasis-displayed. In the case where the workflow is not completed and the sorting order of the folder is "order of inputting time/date", the processes of steps S1412 to S1414 are executed, and the thumbnail image is emphasis-displayed (distinction display) in step S1415.

In step 2005, the FAX returning process is executed. The FAX returning process may be executed by a method whereby a drawing to FAX driver software is performed from the client application of the document management system and drawing data is transmitted to a FAX telephone number destination which was input or a method whereby the server terminal 102 FAX-transmits by using the FAX driver software installed in the server terminal 102.

In step 2006, the client terminal 101 searches for the document list information obtained from the document table of FIG. 17 by using the document ID of the FAX-transmitted document as a key and changes the item "processing state" of the searched record to "1" showing "end". Thus, "end" of the workflow is determined.

In step 2007, when the client terminal 101 executes the FAX returning process in step 2005, the display screen is shifted to the display screen on which the thumbnail image of FIG. 14 was displayed and a thumbnail image of the relevant document is drawn again. If the image has been emphasis-displayed, in order to cancel it, the bordering image displayed in the thumbnail image corresponding to the FAX-transmitted document ID is deleted. More specifically speaking, in the client terminal 101, the processing state of the document ID of the FAX-transmitted document (the document in which the workflow process has been completed) is discriminated (discrimination about whether or not the workflow has been completed). If the workflow has been completed, the bordering image is deleted and the thumbnail image without emphasis is displayed. In this case, the thumbnail image without emphasis may be obtained from the server terminal 102 and displayed. Or, it is also possible to construct in such a manner that if the thumbnail image without emphasis has previously been stored in the RAM 203, the image is switched from the emphasis-displayed thumbnail image to the thumbnail image without emphasis stored in the RAM 203 and the thumbnail image without emphasis is displayed.

As mentioned above, according to the embodiment, among the documents sorted based on the storing time/date, by distinction-displaying the documents in which the predetermined time has elapsed from the document inputting time/date, a leakage of the documents to be processed can be prevented.

Among the documents which are not accessed for a predetermined time or the documents in which the workflow is not finished yet, if there are the documents in which the predetermined time has elapsed, by emphasis-displaying the thumbnail images, a leakage of the documents to be processed can be prevented.

Although the exemplary embodiment has been mentioned above, the invention can be also embodied as a form of a system, an apparatus, a method, a program, a recording medium, or the like. Specifically speaking, the invention can be also applied to a system constructed by a plurality of apparatuses or to an apparatus comprising one equipment.

The program in the invention is a program by which a computer can execute the processing method of the flow-charts illustrated in FIGS. 9 to 13 and FIGS. 20 to 23. A program by which the computer can execute the processing method of FIGS. 6 to 9 has been stored in the storage medium of the invention. The program in the invention may be a program for every processing method of each apparatus in FIGS. 9 to 13 and FIGS. 20 to 23.

As mentioned above, naturally, the object of the invention is accomplished by a method whereby the recording medium in which the program for realizing the functions of the embodiment mentioned above is supplied to a system or an apparatus, a computer (or a CPU or an MPU) of the system or apparatus reads out and executes the program stored in the recording medium.

In this case, the program itself read out of the recording medium realizes the novel functions of the invention and the recording medium in which the program has been stored constructs the invention.

As a recording medium for supplying the program, for example, a flexible disk, a hard disk, an optical disk, a magnetooptic disk, a CD-ROM, a CD-R, a DVD-ROM, a magnetic tape, a non-volatile memory card, a ROM, an EEPROM, a silicon disk, a solid state drive, or the like can be used.

Naturally, the invention incorporates not only a case where the functions of the embodiment mentioned above are realized by a method whereby the computer executes the read-out program but also a case where the OS (Operating System) or the like which is operating on the computer executes a part or all of actual processes based on instructions of the program and the functions of the embodiment mentioned above are realized by those processes.

Further, naturally, the invention also incorporates a case where the program read out of the recording medium is written into a memory provided for a function expanding board inserted into the computer or a function expanding unit connected to the computer, after that, a CPU or the like provided for the function expanding board or the function expanding unit executes a part or all of actual processes based on instructions of the program codes and the functions of the embodiment mentioned above are realized by those processes.

The invention can be applied to a system constructed by a plurality of apparatuses or to an apparatus comprising one equipment. Naturally, the invention can also cope with a case where the invention is accomplished by supplying the program to the system or apparatus. In this case, by reading out the program from the recording medium in which the program for accomplishing the invention has been stored to the system or apparatus, the system or apparatus can obtain the advantages of the invention.

Further, by downloading and reading out the program for accomplishing the invention from a server, a database, or the like on the network by a communicating program, the system or apparatus can obtain the advantages of the invention.

All of constructions in which each of the foregoing embodiments and their modifications are combined are also incorporated in the invention.

Naturally, the invention is not limited to those embodiments but various modifications and applications are possible within the scope of claims of the invention.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-095311, filed Apr. 16, 2010, and No. 2010-267731, filed Nov. 30, 2010, which are hereby incorporated by reference herein in their entirety.

What is claimed is:

1. An information processing apparatus for displaying document information based on first and second time/date information, the first time/date information indicating a time/date at which document data was registered in a document management system, and the second time/date information indicating a time/date at which the document data was input to a folder, the apparatus comprising a computer which functions as:
    an obtaining unit configured to obtain displaying order information for deciding an order of displaying the document information in a folder when the document information is displayed;
    a sorting unit configured to sort the document information in accordance with the displaying order information obtained by the obtaining unit; and
    a displaying unit configured to display the document information sorted by the sorting unit,
    wherein, if the displaying order information obtained by the obtaining unit is a displaying order based on the second time/date information,
    the sorting unit sorts the document information in accordance with the displaying order based on the second time/date information, and
    the displaying unit displays the document information sorted in accordance with the displaying order based on the second time/date information by the sorting unit such that the document information in which a predetermined time has elapsed from the first time/date information is displayed distinguishably from the document information in which the predetermined time has not elapsed from the first time/date information.

2. The information processing apparatus according to claim 1, wherein, if the displaying order information obtained by the obtaining unit is a displaying order based on the first time/date information, the sorting unit sorts the document information in accordance with the displaying order based on the first time/date information without displaying the document information in which the predetermined time has elapsed from the first time/date information distinguishably from the document information in which the predetermined time has not elapsed.

3. The information processing apparatus according to claim 1, further comprising a discriminating unit configured to discriminate whether or not a workflow of the document data has been completed, wherein in the document information of the document data determined by the discriminating unit that the workflow has not been completed, the displaying unit displays the document information sorted in accordance with the displaying order based on the second time/date information by the sorting unit such that the document information in which the predetermined time has elapsed from the first time/date information is displayed distinguishably from the document information in which the predetermined time has not elapsed.

4. The information processing apparatus according to claim 3, wherein the displaying unit cancels the distinguishable display of the document information of the document data which is determined by the discriminating unit that the workflow has been completed.

5. The information processing apparatus according to claim 1, further comprising a setting unit configured to set the displaying order information for every folder which displays the document information, and wherein the sorting unit sorts the document information in accordance with the displaying order information set for every folder by the setting unit.

6. The information processing apparatus according to claim 1, wherein the document information includes a thumbnail image of the document data, and the displaying unit displays the thumbnail image included in the document information sorted in accordance with the displaying order based on the second time/date information by the sorting unit such that the thumbnail image of the document information in which a predetermined time has elapsed from the first time/date information is displayed distinguishably from the thumbnail image of the document information in which the predetermined time has not elapsed.

7. The information processing apparatus according to claim 6, further comprising:

a color information obtaining unit configured to obtain color information adapted to perform the distinguishable display; and an image forming unit configured to form an image which is synthesized with the thumbnail image in accordance with the color information obtained by the color information obtaining unit, wherein the displaying unit synthesizes the image formed by the image forming unit and the thumbnail image and distinguishably displays the synthesized image.

8. The information processing apparatus according to claim 1, wherein the first time/date information indicates a time/date at which the document data was received via facsimile.

9. An information processing method carried out in an information processing apparatus having a display unit for displaying document information based on first and second time/date information, the first time/date information indicating a time/date at which document data was registered in a document management system, and the second time/date information indicating a time/date at which the document data was input to a folder, the method comprising:

obtaining displaying order information for deciding an order of displaying the document information in a folder when the document information is displayed;

sorting the document information in accordance with the obtained displaying order information; and displaying the sorted document information, wherein, if the displaying order information obtained in the obtaining step is a displaying order based on the second time/date information, the sorting step sorts the document information in accordance with the displaying order based on the second time/date information, and the displaying step displays the document information sorted in accordance with the displaying order based on the second time/date information in the sorting step such that the document information in which a predetermined time has elapsed from the first time/date information is displayed distinguishably from the document information in which the predetermined time has not elapsed from the first time/date information.

10. A non-transitory computer-readable storage medium storing a computer program that causes a computer to execute the information processing method according to claim 9.

* * * * *